(12) United States Patent
Hill

(10) Patent No.: US 7,164,480 B2
(45) Date of Patent: Jan. 16, 2007

(54) COMPENSATION FOR EFFECTS OF MISMATCH IN INDICES OF REFRACTION AT A SUBSTRATE-MEDIUM INTERFACE IN NON-CONFOCAL, CONFOCAL, AND INTERFEROMETRIC CONFOCAL MICROSCOPY

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 439 days.

(21) Appl. No.: 10/771,785

(22) Filed: Feb. 4, 2004

(65) Prior Publication Data

US 2004/0201852 A1    Oct. 14, 2004

Related U.S. Application Data

(60) Provisional application No. 60/444,707, filed on Feb. 4, 2003.

(51) Int. Cl.
*G01B 9/02* (2006.01)
(52) U.S. Cl. ........................... 356/511; 356/517
(58) Field of Classification Search ............... 356/496, 356/504, 512, 511, 517
See application file for complete search history.

(56) References Cited

U.S. PATENT DOCUMENTS

| | | | |
|---|---|---|---|
| 3,628,027 A | 12/1971 | Brauss | |
| 3,748,015 A | 7/1973 | Offner | |
| 4,011,011 A | 3/1977 | Hemstreet et al. | |
| 4,226,501 A | 10/1980 | Shafer | |
| 4,272,684 A | 6/1981 | Seachman | |
| 4,685,803 A | 8/1987 | Sommargren | |
| 4,733,967 A | 3/1988 | Sommargren | |
| 5,220,403 A | 6/1993 | Batchelder | |
| 5,241,423 A | 8/1993 | Chiu et al. | |
| 5,327,223 A | 7/1994 | Korth | |
| 5,485,317 A | 1/1996 | Perissinotto | |
| 5,602,643 A | 2/1997 | Barrett | |
| 5,614,763 A | 3/1997 | Womack | |

(Continued)

OTHER PUBLICATIONS

U.S. Appl. No. 09/852,369, filed Jan. 3, 2002, Hill.

(Continued)

*Primary Examiner*—Hwa (Andrew) Lee
(74) *Attorney, Agent, or Firm*—Wilmer Cutler Pickering Hale and Dorr LLP

(57) ABSTRACT

An interferometric microscope for making interferometric measurements of locations within an object that is in a medium, there being a mismatch between indices of refraction of said object and said medium, the microscope including a source for generating an input beam; an interferometer which is configured to receive the input beam and generate therefrom a measurement beam, to focus the measurement beam onto a selected spot in the object and produce for that selected spot a return measurement beam, and to combine the return measurement beam and a reference beam to produce an interference beam; and a detector system which is positioned to receive the interference beam, wherein the return measurement beam travels along a path from the object to the detector system and wherein the interferometer includes a compensating layer of material positioned in the path of the return measurement beam, the compensating layer producing a mismatch in the index of refraction along the path of the return measurement beam that compensates for the mismatch between the indices of refraction of the object and the medium.

39 Claims, 4 Drawing Sheets

U.S. PATENT DOCUMENTS

| | | | |
|---|---|---|---|
| 5,633,972 A | 5/1997 | Walt | |
| 5,659,420 A | 8/1997 | Wakai | |
| 5,699,201 A | 12/1997 | Lee | |
| 5,760,901 A | 6/1998 | Hill | |
| 5,828,455 A | 10/1998 | Smith | |
| 5,894,195 A | 4/1999 | McDermott | |
| 5,915,048 A | 6/1999 | Hill et al. | |
| 6,052,231 A | 4/2000 | Rosenbluth | |
| 6,091,496 A | 7/2000 | Hill | |
| 6,124,931 A | 9/2000 | Hill | |
| 6,271,923 B1 | 8/2001 | Hill | |
| 6,330,065 B1 | 12/2001 | Hill | |
| 6,445,453 B1 | 9/2002 | Hill | |
| 6,447,122 B1 | 9/2002 | Kobayashi et al. | |
| 6,480,285 B1 | 11/2002 | Hill | |
| 6,552,805 B1 | 4/2003 | Hill | |
| 6,552,852 B1 | 4/2003 | Hill | |
| 6,597,721 B1 | 7/2003 | Hutchinson et al. | |
| 6,606,159 B1 | 8/2003 | Hill | |
| 6,667,809 B1 | 12/2003 | Hill | |
| 6,714,349 B1 | 3/2004 | Nam | |
| 6,717,736 B1 | 4/2004 | Hill | |
| 6,753,968 B1 | 6/2004 | Hill | |
| 6,775,009 B1 | 8/2004 | Hill | |
| 6,847,029 B1 | 1/2005 | Hill | |
| 6,847,452 B1 | 1/2005 | Hill | |
| 2002/0074493 A1 | 6/2002 | Hill | |
| 2003/0174992 A1 | 9/2003 | Levene | |
| 2004/0201852 A1 | 10/2004 | Hill | |
| 2004/0201853 A1 | 10/2004 | Hill | |
| 2004/0201854 A1 | 10/2004 | Hill | |
| 2004/0201855 A1 | 10/2004 | Hill | |
| 2004/0202426 A1 | 10/2004 | Hill | |
| 2004/0227950 A1 | 11/2004 | Hill | |
| 2004/0227951 A1 | 11/2004 | Hill | |
| 2004/0228008 A1 | 11/2004 | Hill | |
| 2004/0246486 A1 | 12/2004 | Hill | |
| 2004/0257577 A1 | 12/2004 | Hill | |

OTHER PUBLICATIONS

U.S. Appl. No. 09/917,402, filed Jul. 27, 2001, Hill.
U.S. Appl. No. 60/442,858, filed Jul. 27, 2002, Hill.
U.S. Appl. No. 60/442,982, filed Jan. 29, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/459,425, filed Apr. 11, 2003, Hill.
U.S. Appl. No. 60/460,129, filed Apr. 3, 2003, Hill.
Silfvast, W. (1995) "Lasers", *Handbook of Optics*, New York:: McGraw-Hill, Ch. 11.
Stoicheff, et al. "Tunable, Coherent Sources for High Resolution VUV and XUV Spectroscopy", *Laser Techniques for Extreme Ultraviolet Spectroscopy*, p. 19 (1982).
Harris, et al. "Generation of Ultraviolet and Vacuum Ultraviolet Radiation" *Laser Spectroscopy*.
Kung, A.H., "Generation of Tunable Picosecond VUV Radiation" *Appl. Phys Lett.* 25, p. 653 (1974).
D'ariano, et al. "Lower Bounds on Phase Sensitivity in Ideal and Feasible Measurements" *Phys. Rev. A* 49, pp. 3022-3036 (194).

COMPENSATION FOR EFFECTS OF MISMATCH IN INDICES OF REFRACTION AT A SUBSTRATE-MEDIUM INTERFACE IN NON-CONFOCAL, CONFOCAL, AND INTERFEROMETRIC CONFOCAL MICROSCOPY

This application claims the benefit of U.S. Provisional Application No. 60/444,707, filed Feb. 4, 2003.

TECHNICAL FIELD

This invention relates to confocal and non-confocal microscopy.

BACKGROUND OF THE INVENTION

In the field of microscopy, when a mismatch in indices of refraction at a corresponding medium/substrate interface exists, a specially-designed microscope is sometimes used to image a section at a specified depth in the substrate. The microscope is compensated for use in imaging a section of the substrate at the specified depth and for a specific substrate index of refraction. When using that approach, to examine different depths and different substrate indices of refraction, one must have available an array of microscope designs that correspond to the array of depths within the substrate and of substrate indices of refraction.

SUMMARY OF THE INVENTION

Apparatus and method are described for compensating effects of a mismatch in refractive indices at an interface of a substrate under examination and air or some other medium in non-confocal, confocal, and interferometric confocal microscopy. The compensation is sufficient to obtain diffraction limited lateral and longitudinal depth resolutions for wavelengths including UV and VUV and for depths within the substrate of the order of a few microns and larger. The compensation technique involves introducing a thin layer of low index of refraction in image space of non-confocal microscopes and in both the confocal pinhole object space and image space of confocal and interferometric confocal microscopes. A set of thin layers comprising different thicknesses and/or different values of low indices of refraction may be required to cover a range in index of refraction values for the substrate and/or a range in depth within the substrate. The set of different compensations may be incorporated simultaneously in a lateral array of thin layers in a microscopy system so that diffraction limited images of a substrate may be obtained with a single microscopy system for different depths and for a substrate whose index of refraction is not isotropic laterally and/or longitudinally. For confocal and interferometric confocal microscopes comprising a pinhole-array beam-splitter, a single array of a set of thin layers of low indices of refraction is introduced at or near the pinhole-array beam-splitter.

In general, in one aspect, the invention features an interferometric microscope for making interferometric measurements of locations within an object that is in a medium, there being a mismatch between indices of refraction of the object and the medium. The microscope includes a source for generating an input beam; an interferometer which is configured to receive the input beam and generate therefrom a measurement beam, to focus the measurement beam onto a selected spot in the object and produce for that selected spot a return measurement beam, and to combine the return measurement beam and a reference beam to produce an interference beam; and a detector system which is positioned to receive the interference beam. The return measurement beam travels along a path from the object to the detector system and the interferometer includes a compensating layer of material positioned in the path of the return measurement beam, wherein the compensating layer produces a mismatch in the index of refraction along the path of the return measurement beam that compensates for the mismatch between the indices of refraction of the object and the medium.

Other embodiments include one or more of the following features. The interferometric microscope is a confocal interferometric microscope and the interferometer includes a plate positioned before the detector, wherein the plate defines a pinhole through which the return measurement beam passes, and wherein the compensating layer is located along the path of the return measurement beam before the plate. The compensating layer is immediately adjacent to the plate. The interferometer also includes a plate defining a pinhole that is imaged onto the selected spot by the interferometer, wherein the interferometer further includes a compensating layer adjacent to the second-mentioned plate and positioned to produce a mismatch in the index of refraction along a beam path from the second-mentioned pinhole to the object that compensates for the mismatch between the indices of refraction of the object and the medium. The first- and second-mentioned plates are the same plate, the first- and second-mentioned pinholes are the same pinhole, and the first- and second-mentioned compensating layers are the same compensating layer.

Still other embodiments include one or more of the following features. The plate includes an array of pinholes, the first-mentioned pinhole being one of the pinholes of the array of pinholes. The index of refraction of the object is $n_o$, the index of refraction of the medium immediately above the object is $n_m$, the index of refraction of the compensating layer is $n_c$, and the index of refraction of the medium through which the return measurement beam passes just before reaching the compensating layer is $n_r$, and $n_o > n_m$ and $n_c < n_r$. Or alternatively, the compensating layer provides compensation that is sufficient to obtain diffraction limited lateral and longitudinal depth resolutions within the object. The compensating layer is readily removable so that it can be replaced with a different compensating layer. The medium is air.

In general, in another aspect, the invention features a confocal interferometry system for making interferometric measurements of locations within an object that is in a medium, there being a mismatch between indices of refraction of the object and the medium. The system includes a plate defining a pinhole positioned to receive a source beam and separate the source beam into a reference beam on one side of the pinhole and a measurement beam on the other side of the pinhole; an imaging system for imaging the pinhole onto a spot in the object so that the measurement beam is directed to the spot and produces for the spot a return measurement beam, wherein the first imaging system is also arranged to image the spot onto the pinhole so that the return measurement beam from the spot is directed back to the pinhole, wherein the pinhole combines the return measurement and reference beams to produce a combined beam; and a detector system including a detector element that receives the combined beam. The return measurement beam travels along a corresponding path from the object to the detector system and the interferometer includes a compensating layer of material positioned in the corresponding path of the return measurement beam, wherein the compensating layer produces a mismatch in the index of refraction along the corresponding path of the return measurement beam that compensates for the mismatch between the indices of refraction of the object and the medium.

Other embodiments include one or more of the following features. The confocal interferometry system also includes a second imaging system that images the pinhole onto the detector element so that the combined beam is directed to the detector element. The first imaging system is a catadioptric imaging system. The compensating layer is positioned along the corresponding path of the return measurement beam between the plate and the object. The compensating layer is either near the plate or up against the plate. The plate includes an array of pinholes, the first-mentioned pinhole being one of the pinholes of the array of pinholes.

In still other embodiments, the first-mentioned imaging system includes a beam splitter positioned to receive, for each pinhole, the measurement beam and separate that measurement beam into a transmitted portion and a reflected portion; and a reflecting surface positioned to image the pinhole onto the spot via the beam splitter and thereby direct the measurement beam from that pinhole onto the spot. The reflecting surface is substantially concentric with a point on the object. The first-mentioned imaging system also includes a refracting surface positioned between the object and the beam splitter to receive light rays from the object. The first reflecting surface substantially conforms to a sphere having a first radius and the refracting surface conforms to a sphere having a second radius, wherein the first radius is greater than the second radius. Also, the first reflecting surface and the refracting surface have the same center of curvature. The first-mentioned imaging system also includes a refracting surface positioned between the beam splitter and the pinhole array to receive light rays focused by the reflecting surface. In that case, the reflecting surface is substantially concentric with an image point on the pinhole array. The first-mentioned imaging system also includes a second reflecting surface on the other side of the beam splitter from the first-mentioned reflecting surface and positioned to image the pinhole onto the spot in the object via the beam splitter.

In general, in still another aspect, the invention features a confocal interferometry system for making interferometric measurements of locations within an object that is in a medium, there being a mismatch between indices of refraction of said object and said medium. In this case, the system includes an array of pinholes positioned to receive a source beam and, for each pinhole in the array of pinholes, separate the source beam into a corresponding reference beam on one side of the array of pinholes and a corresponding measurement beam on the other side of the array of pinholes; an imaging system arranged to image the array of pinholes onto an array of spots in the object so that the corresponding measurement beam for each pinhole of the array of pinholes is directed to a different corresponding spot of the array of spots and produces for that spot a corresponding return measurement beam, wherein the imaging system is also arranged to image the array of spots onto the array of pinholes so that the corresponding return measurement beam from each spot of the array of spots is directed back to a corresponding different pinhole in the array of pinholes, wherein for each pinhole the pinhole array combines the return measurement and reference beams for that pinhole to produce a corresponding combined beam. The system also includes a detector system including an array of detector elements aligned with the array of pinholes so that the corresponding combined beam for each pinhole is directed to different corresponding detector element of the array of detector elements, wherein the return measurement beams travel along corresponding paths from the object to the detector system and wherein the interferometer includes a compensating layer of material positioned in the corresponding paths of the return measurement beams and for producing a mismatch in the index of refraction along the corresponding paths of the return measurement beams that compensates for the mismatch between the indices of refraction of the object and the medium.

In general, in still yet another aspect, the invention features a microscope for making measurements of locations within an object that is in a medium, there being a mismatch in indices of refraction between the object and the medium. The microscope includes a source for generating an input beam; a detector system; an imaging system for focusing at least part of the input beam onto a selected spot in the object to produce a return beam; and an imaging system for imaging the selected spot onto the detector system, wherein the return beam travels along a path from the object to the detector assembly and wherein the second-mentioned imaging system includes a compensating layer of material positioned in the path of the return beam for producing a mismatch in the index of refraction along the path of the return beam that compensates for the mismatch in the indices of refraction of the object and the medium.

An advantage of at least one embodiment of the present invention is that the properties of a microscope designed for compensation of a specific index of refraction mismatch between a substrate and a medium can be readily changed to compensate for a different index of refraction mismatch.

Another advantage of at least one embodiment of the present invention is that a single microscope system is used wherein the index of refraction of a substrate may not be isotropic over its surface and where different depths within the substrate including the surface of the substrate may be imaged.

An advantage of at least one embodiment of the present invention is that a single microscope system may be used to image a surface of a substrate and/or internal sections of the substrate wherein the substrate index of refraction may not be isotropic over its surface or in depth into the substrate and where different depths within the substrate including the substrate surface may be imaged.

Another advantage of at least one embodiment of the present invention is that diffraction limited lateral and longitudinal resolutions may be obtained for wavelengths in the IR, visible, UV, and VUV and for depths in the substrate of the order of a few microns and larger using a single microscope system and where the index of refraction of a substrate is not isotropic laterally or longitudinally.

Another advantage of at least one embodiment of the present invention is that the compensation technique of the present invention may be incorporated in a number of different microscope types including non-confocal, confocal, and interferometric confocal microscopes.

Another advantage of at least one embodiment of the present invention is that a compensating thin film layer may be fabricated using microlithography technology.

Another advantage of at least one embodiment of the present invention is that a pinhole-array beam-splitter may be used in a confocal or an interferometric confocal microscopy system which eliminates the requirement for alignment of multiple arrays of pinholes present in prior art confocal and interferometric confocal microscopy systems and reduces the number of arrays of compensating thin film layers to one array.

Another advantage of at least one embodiment of the present invention is that incorporation of the present invention into a non-confocal, confocal or interferometric confocal microscope for compensation of effects of a mismatch in index of refraction at an interface of a substrate and a medium does not the affect the respective fields of view.

Another advantage of at least one embodiment of the present invention is that the usable wavelengths extend into the VUV range with the VUV cutoff determined by transmission properties of optical components, e.g., UV grade fused silica, $CaF_2$, and LiF.

DETAILED DESCRIPTION

A technique is described that uses index of refraction mismatches in the image space of a non-confocal microscopy system and in both the confocal source-pinhole space and the confocal image-pinhole space of measurement beams of a confocal or an interferometric confocal microscopy system to compensate the effect of a mismatch in refractive indices between a medium and a substrate that is being imaged. The index of refraction mismatch in the respective source and image spaces is generated by the introduction of an array of thin compensating layers that have a low index of refraction. The thicknesses and indices of refraction of the thin compensating layers are selected according to properties of the microscopy system, to the depth in the substrate being imaged, and to the degree of the substrate/medium index of refraction mismatch. For confocal and interferometric confocal microscopes that use a pinhole-array beam-splitter, the number of arrays of compensating thin layers is reduced to a single array.

Figure 1A:
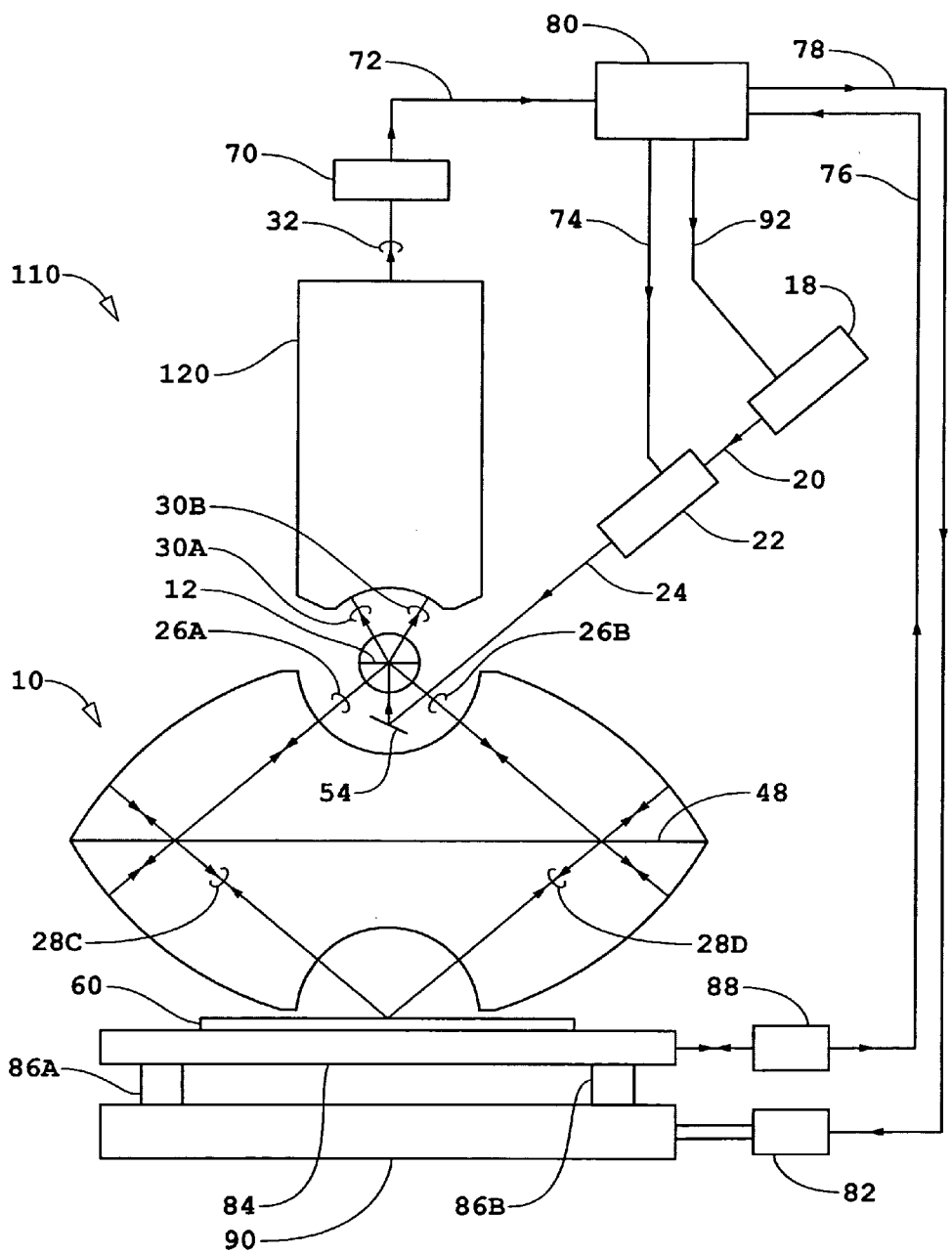
FIG. 1a is a diagrammatic representation of an interferometric imaging system that uses a catadioptric imaging system.
Figure 1B:
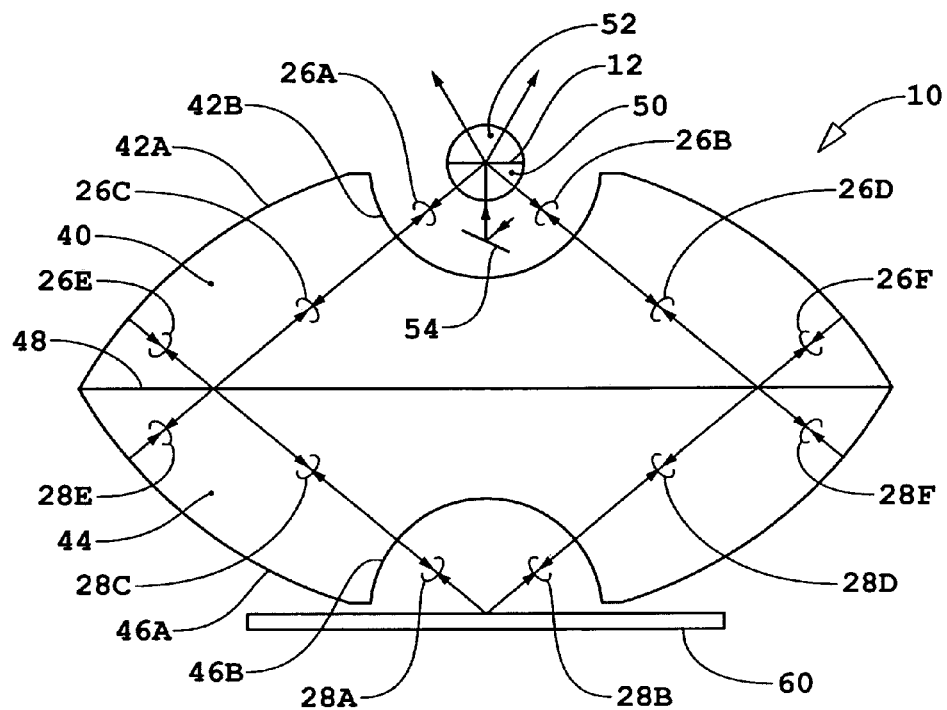
FIG. 1b is a diagrammatic representation of a catadioptric imaging system.

A first embodiment is shown schematically in FIG. 1a and comprises a confocal interferometric microscopy system that uses a pinhole-array beam-splitter. The confocal interferometric microscopy system of the first embodiment comprises a first imaging system generally indicated as 10, beam-splitter 12, detector 70, and a second imaging system generally indicated as 110. The second imaging system 110 is a low power microscope having a large working distance, e.g. Nikon ELWD and SLWD objectives and Olympus LWD, ULWD, and ELWD objectives. Beam-splitter 12 comprises a pinhole-array beam-splitter such as described in commonly owned U.S. Provisional Patent Application No. 60/442,982 (ZI-45) entitled "Interferometric Confocal Microscopy Incorporating Pinhole Hole Array Beam-Splitter" and U.S. patent application filed Jan. 27, 2004 (ZI-45) also entitled "Interferometric Confocal Microscopy Incorporating Pinhole Array Beam-Splitter" both of which are by Henry A. Hill. The contents of both of the cited patent applications are herein incorporated in their entirety by reference. First imaging system 10 is shown schematically in FIG. 1b. Imaging system 10 is a catadioptric system such as described in commonly owned U.S. patent application Ser. No. 10/028,508 (ZI-38) entitled "Catoptric and Catadioptric Imaging System," U.S. Provisional Patent Application No. 10/366,651 (ZI-43) entitled "Catoptric and Catadioptric Imaging Systems," U.S. Provisional Patent Application No. 60/501,666 [ZI-54] entitled "Catoptric and Catadioptric Imaging Systems With Adaptive Catoptric Surfaces," and U.S. Provisional Patent Application filed Sep. 26, 2003 [ZI-56] entitled "Catoptric and Catadioptric Imaging Systems Comprising Pellicle Beam-Splitters And Non-Adaptive And Adaptive Catoptric Surfaces" all four of which are by Henry A. Hill. The contents of the four cited patent applications are herein incorporated in their entirety by reference.

Figure 1C:
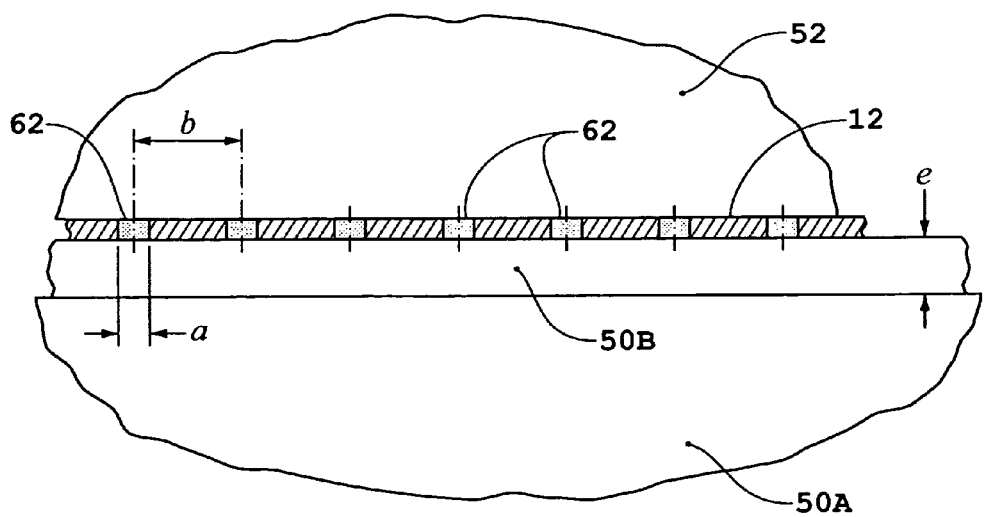
FIG. 1c is a diagrammatic representation of a pinhole array beam-splitter.

Catadioptric imaging system 10 comprises catadioptric elements 40 and 44, beam-splitter 48, and convex lens 50A (see FIG. 1c). Surfaces 42A and 46A are convex spherical surfaces with nominally the same radii of curvature and the respective centers of curvature of surfaces 42A and 46A are conjugate points with respect to beam-splitter 48. Surfaces 42B and 46B are concave spherical surfaces with nominally the same radii of curvature. The centers of curvature of surfaces 42B and 46B are the same as the centers of curvature of surfaces 46A and 42A, respectively. The center of curvature of convex lens 50A is the same as the center of curvature of surfaces 42B and 46A. The radius of curvature of surface 46B is selected so as to minimize the loss in efficiency of imaging system 10 with respect to occluded portions of a pupil and to produce a working distance for imaging system 10 acceptable for an end use application. The radius of curvature of convex lens 50A is selected in conjunction with the index of refraction of convex lens 50A so that off-axis aberrations of the catadioptric imaging system 10 are compensated for an extended field of view. The medium of elements 40 and 44 may be for example UV grade fused silica, $CaF_2$ or a commercially available glass such as SF11. The medium of convex lens 50A may be for example fused silica, $CaF_2$, YAG, or a commercially available glass such as SF11. An important consideration in the selection of the medium of elements 40 and 44 and convex lens 50A will be the transmission properties for the wavelengths of beams comprising beam 24.

Convex lens 52 has a center of curvature the same as the center of curvature of convex lens 50A. In the first embodiment, convex lenses 50A and 52 are bonded together with pinhole-array beam-splitter 12 and a compensating layer 50B in between. Pinhole-array beam-splitter 12 and compensating layer 50B are shown in FIG. 1c. In other embodiments, sub-wavelength gaps are maintained between pinhole-array beam-splitter 12 and compensating layer 50B so that pinhole-array beam-splitter 12 and compensating layer 50B of may be translated as part of scanning procedure. Transmission through the gaps is by frustrated internal reflection. The pattern of pinholes in pinhole-array beam-splitter is chosen to match the requirements of an end use application. An example of a pattern is a two-dimensional array of equally spaced pinholes in two orthogonal directions. The pinholes may comprise circular apertures, rectangular apertures, or combinations thereof such as described in commonly owned U.S. patent application Ser. No. 09/917,402 (ZI-15) entitled "Multiple-Source Arrays for Confocal and Near-field Microscopy" by Henry A. Hill and Kyle Ferrio of which the contents thereof are included herein in their entirety by reference. A nonlimiting example of a pinhole array for pinhole-array beam-splitter 12 is shown in FIG. 1c having a spacing between pinholes of b with aperture size a.

The thickness e and index of refraction $n_4$ of compensating layer 50B (see FIG. 1c) are selected in relation to the index of refraction of convex lens 50A, the index of refraction of substrate 60, and the depth of a section in substrate 60 that is being imaged.

Input beam 24 is reflected by mirror 54 to pinholearray beam-splitter 12 where a first portion thereof is transmitted as reference beam components of output beam components 30A and 30B and a second portion thereof scattered as measurement beam components of beam components 26A and 26B. The measurement beam components of beam components 26A and 26B are imaged as components of beam components 28A and 28B to an array of image spots in an image plane close to the surface of substrate 60. A portion of the components of beam components 28A and 28B incident on substrate 60 are reflected and/or scattered as return measurement beam components of beam components 28A and 28B. Return measurement beam components of beam components 28A and 28B are imaged by catadioptric imaging system 10 to spots that are coincident with the pinholes of pinhole-array beam-splitter 12 and a portion thereof is transmitted as return measurement beam components of output beam components 30A and 30B.

The description of the imaging properties of catadioptric imaging system 10 is the same as the corresponding portion of the description given for the imaging properties of catadioptric imaging system 10 in cited U.S. Provisional Patent Application No. 60/442,982 (ZI-45) and U.S. Pat. No. 7,084,983 filed Jan. 27, 2004 entitled "Interferometric Confocal Microscopy Incorporating Pinhole Array Beam-Splitter".

The next step is the imaging of output beam components 30A and 30B by imaging system 110 to an array of spots that coincide with the pixels of a multi-pixel detector such as a CCD to generate an array of electrical interference signals 72. The array of electrical interference signals is transmitted to signal processor and controller 80 for subsequent processing.

Aberations such as spherical aberration will be introduced in the return measurement beam components of return measurement beam components of beam components 26A and 26B when the spot that is being imaged is located a distance $z_1$ below the surface of substrate 60 and the index of refraction $n_1$ of substrate 60 and the index of refraction $n_2$ of a contiguous medium are different. The aberrations are compensated by the selection of thickness e and index of refraction $n_4$ of compensating layer 50B.

Figure 2:
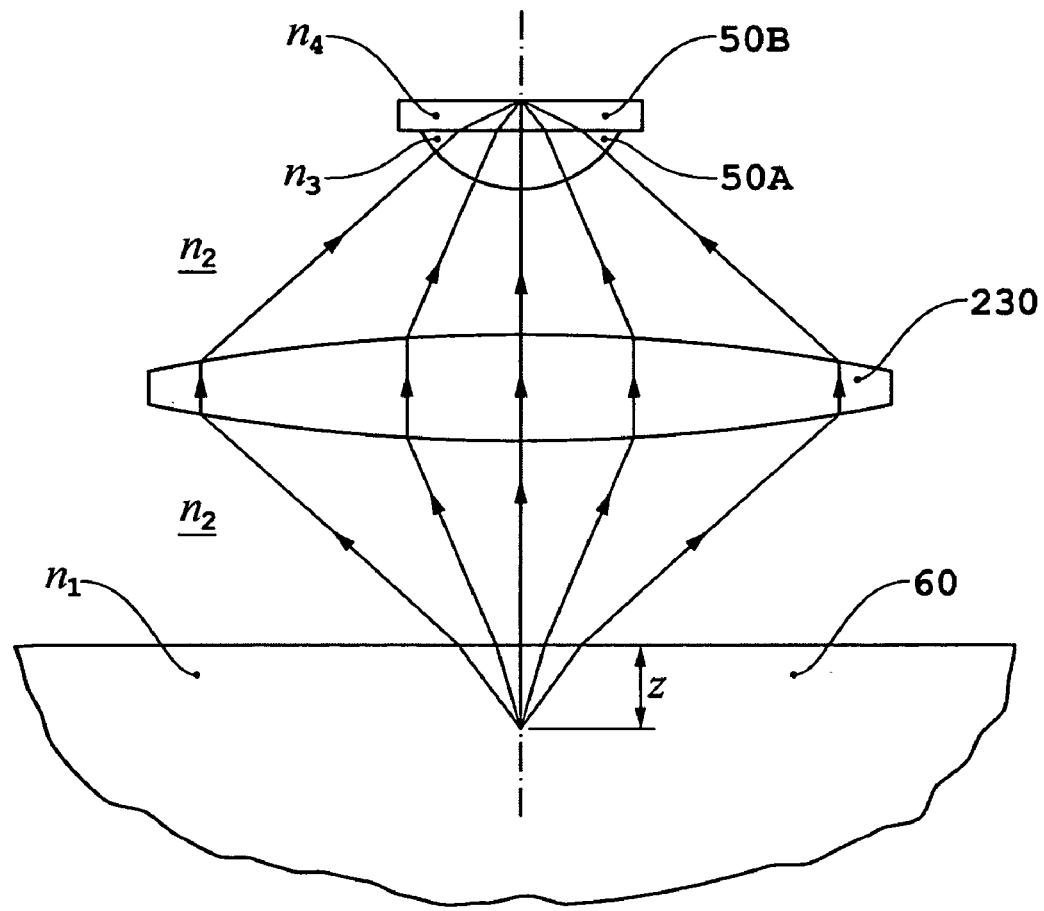
FIG. 2 is a schematic diagram of compensation of aberrations generated by a mismatch between the refractive index of a substrate being imaged and an adjacent medium.

The compensation of the aberrations by compensating layer 50B such as spherical aberrations introduced when the spot being imaged is located a distance z below the surface of substrate 60 and the index of refraction $n_1$ of substrate 60 and the index of refraction $n_2$ of a contiguous medium are different is shown diagrammatically in FIG. 2. In FIG. 2, catadioptric imaging system 10 has been replaced by a double convex lens 230 in order to simply the description without departing from the scope and spirit of the invention and to show by an example that the compensation procedure is not unique to the catadioptric imaging system 10.

At the interface between substrate 60 and the contiguous medium where $n_2 < n_1$, rays of the beam diverging from the spot in substrate 60 are refracted such that the spot appears at a depth of $(n_2/n_1) z$ for a small numerical aperture. As the numerical aperture is increased, the apparent depth of the spot decreases producing aberrations such as spherical and higher order aberrations. When $n_4 \neq n_3$, layer 50B will also introduce aberrations such as spherical and higher order aberrations by same mechanism that the aberrations are introduced at the surface of substrate 60. When $n_4 < n_3$, the sign of the aberrations introduced by layer 50B will generally have a sign opposite to the aberrations introduced at the surface of substrate 60. Thus, the thickness of layer 50B can be selected so that the aberrations introduced at the surface of substrate 60 are compensated in first order at the conjugate image spot.

The selection of thickness e and index of refraction $n_4$ can be performed using a ray trace program such as Zemax Optical Design Program by Focus Software, Inc. One solution set corresponding to a depth of 2 microns for location of an imaged spot inside substrate 60 and a numerical aperture NA=0.88 in the image space above substrate 60 is e=300 nm and $n_4$=1.37 for compensating layer 50B parameters at a wavelength of 400 nm with convex lens 50A, catadioptric lenses 40 and 44, and substrate 60 comprising fused silica. It is assumed for the solution set that $n_2$=1. Without compensating layer 50B, the root-mean-square radius of the imaged spot in substrate 60 is 134 nm for a radius of curvature of 50 mm for surfaces 42A and 46A. With the use of compensating layer 50B with the solution set parameters, the root-mean-square radius of the imaged spot in substrate 60 is reduced in size to 40 nm. For a radius of curvature of 25 mm for surfaces 42A and 46A, the uncompensated and compensated root-mean-square radii of imaged spots in substrate 60 are 77 nm and 20 nm, respectively. Similar results with respect to reduction of aberrations are obtained for solution sets designed for longer wavelengths, UV and VUV wavelengths, e.g. 150 nm and shorter wavelengths.

An array of different solution sets for compensating layer 50B may be used in a single application such that different depths in substrate 60 that has a non-isotropic index of refraction may be imaged by the selection of the appropriate solution set of the array of different solution sets for acquisition of respective conjugated quadratures of fields. The array of different solution sets in a single application may be fabricated using microlithography techniques. Also, compensating layer 50B may comprise two or more layers without departing from the scope or spirit of the present invention.

There are four different implementations of the homodyne detection method that are used in various interferometric embodiments. The four different implementations are referred to as single-, double-, bi-, and quad-homodyne detection methods. For the single-homodyne detection method, input beam 24 comprises a single frequency component and a set of four measurements of the array of electrical interference signals 72 is made. For each of the four measurements of the array of electrical interference signals 72, a known phase shift is introduced between the reference beam component and respective return measurement beam components of output beam components 30A and 30B. The subsequent data processing procedure used to extract the conjugated quadratures of the reflected and/or scattered return measurement beam for an input beam comprising a single frequency component is described for example in commonly owned U.S. Pat. No. 6,445,453 (ZI-14) entitled "Scanning Interferometric Near-Field Confocal Microscopy" by Henry A. Hill, the contents of which are herein incorporated in their entirety by reference.

The double-homodyne detection method uses input beam 24 comprising four frequency components and four detectors to obtain measurements of electrical interference signals that are subsequently used to obtain conjugated quadratures. Each detector element of the four detector elements obtains a different one of the four electrical interference signal values with the four electrical interference signal values obtained simultaneously to compute the conjugated quadratures for a field. Each of the four electrical interference signal values contains only information relevant to one orthogonal component of the conjugated quadratures. The double-homodyne detection used herein is related to the detection methods such as described in Section IV of the article by G. M D'ariano and M G. A. Paris entitled "Lower Bounds On Phase Sensitivity In Ideal And Feasible Measurements," *Phys. Rev. A* 49, 3022–3036 (1994). Accordingly, the double-homodyne detection method does not make joint determinations of conjugated quadratures of fields wherein each electrical interference signal value contains information simultaneously about each of two orthogonal components of the conjugated quadratures.

The bi- and quad-homodyne detection methods obtain measurements of electrical interference signals wherein each measured value of an electrical interference signal contains simultaneously information about two orthogonal components of conjugated quadratures. The two orthogonal components correspond to orthogonal components of conjugated quadratures such as described in cited U.S. Provisional Patent Application No. 60/442,858 (ZI-47) and cited U.S. patent application filed Jan. 27, 2004 (ZI-47) entitled "Apparatus and Method for Joint Measurements of Conjugated Quadratures of Fields of Reflected/Scattered and Transmitted Beams by an Object in Interferometry."

Conjugated quadratures of fields of the return measurement beam are obtained by single-, double-, bi-, and quad-homodyne detection methods in the various interferometric embodiments. For each of the homodyne detection methods, a set of four measurements of the array of electrical interference signals 72 is made. For each of the four measurements of the array of electrical interference signals 72, a known phase shift is introduced between the reference beam components and respective return measurement beam components of output beam components 30A and 30B. A non-limiting example of a known set of phase shifts comprise 0, π/4, π/2, and 3π/2 radians, mod 2π.

For various interferometric embodiments, input beam 24 comprises one frequency component for the single-homodyne detection method. For the bi-homodyne detection method, input beam 24 comprises two frequency components and for double- and quad-homodyne detection methods, input beam 24 comprises four frequency components. The phase shifts are generated by either shifting the frequencies of frequency components of input beam 24 between known frequency values or by introducing phase shifts between the reference and measurement beam components of input beam 24. In certain of the interferometric embodiments, there is a difference between the optical path lengths of the reference beam components and the respective return beam components of output beam components such for output beam components 30A and 30B in interferometer 10. As a consequence, a change in frequency of a frequency component of input beam 24 will generate a relative phase shift between the corresponding reference beam components and the respective return beam components of output beam components 30A and 30B.

For an optical path difference L between the reference beam components and the respective return measurement beam components of output beam components 30A and 30B, there will be for a frequency shift Δf a corresponding phase shift φ where $$\varphi = 2\pi L\left(\frac{\Delta f}{c}\right) \quad (1)$$

and c is the free space speed of light. Note that L is not a physical path length difference and depends for example on the average index of refraction of the measurement beam and the return measurement beam paths. For an example of a phase shift φ=π, 3π, 5π, . . . and a value of L=0.25 m, the corresponding frequency shifts are Δf=600 MHz, 1.8 GHz, 3.0 GHz, . . . .

The frequencies of components of input beam 24 are determined by the mode of operation of source 18 and of beam-conditioner 22 according to control signals 92 and 74 generated by electronic processor and controller 80.

Two different modes of operation are described for the acquisition of the four arrays of electrical interference signal values. The first mode to be described is a step and stare mode wherein substrate 60 is stepped between fixed locations for which image information is desired. The second mode is a scanning mode. In the step and stare mode for generating a one-, a two-, or a three-dimensional image of substrate 60, substrate 60 is translated by stage 90 wherein substrate 60 is mounted on wafer chuck 84 and wafer chuck 84 mounted on stage 90. The position of stage 90 is controlled by transducer 82 according to servo control signal 78 from electronic processor and controller 80. The position of stage 90 is measured by metrology system 88 and position information acquired by metrology system 88 is transmitted to electronic processor and controller 80 to generate an error signal for use in the position control of stage 90. Metrology system 88 may comprise for example linear displacement and angular displacement interferometers and cap gauges.

Electronic processor and controller 80 translates stage 90 to a desired position and then the set of four electrical interference signal values corresponding to the set of four phase shifts 0, π/4, π/2, and 3π/2, mod 2π, are acquired. After the acquisition of the set of four arrays of electrical interference signal values, electronic processor and controller 80 then repeats the procedure for the next desired position of stage 90. The elevation and angular orientation of substrate 60 is controlled by transducers 86A and 86B.

The second of the two modes for the acquisition of the set of four arrays of electrical interference signal values is next described wherein the set of four arrays of electrical interference signal values are obtained with the position of stage 90 being scanned continuously in one or more directions. In the scanning mode, source 18 is pulsed at times controlled by signal 92 from signal processor and controller 80. Source 18 is pulsed at times corresponding to the registration of the conjugate image of pinholes of pinhole-array beam-splitter 12 with positions on and/or in substrate 60 for which image information is desired.

There are a number of different ways for producing a pulsed source [see Chapter 11 entitled "Lasers", *Handbook of Optics*, 1, 1995 (McGraw-Hill, New York) by W. Silfvast]. There will be a restriction on the duration or "pulse width" of a beam pulse $\tau_{p1}$ produced by source 18 as a result of the continuous scanning used in the scanning mode. Pulse width $\pi_{p1}$ will be a parameter that in part controls the limiting value for spatial resolution in the direction of a scan to a lower bound of $$\tau_{p1} V, \quad (2)$$

where V is the scan speed. For example, with a value of $\tau_{p1}$=50 nsec and a scan speed of V=0.20 m/sec, the limiting value of the spatial resolution $\tau_{p1}V$ in the direction of scan will be $$\tau_{p1}V=10 \text{ nm}. \qquad (3)$$

The frequencies of components of input beam 24 are controlled by signals 92 and 74 from signal processor and controller 80 to correspond to frequencies from a set of four frequencies that will yield the desired phase shifts of the set of four phase shifts between the reference and return measurement beam components of output beam components 30A and 30B. In the first mode for the acquisition of the electrical interference signal values, each set of the sets of arrays of four electrical interference signal values corresponding to the set of four phase shift values are generated by a single pixel of detector 70 for single- and bi-homodyne detection method, by two pixels of detector 70 for the quad-homodyne detection method, and by four pixels of detector 70 for the double-homodyne detection methods. In the second mode for the acquisition of the electrical interference signal values, each corresponding set of four electrical interference signal values are generated by a conjugate set of four different pixels of detector 70 for each of the four homodyne detection methods. Thus in the second mode of acquisition, the differences in pixel efficiency and the differences in sizes of pinholes in pinhole-array beam-splitter 12 need to be compensated in the signal processing by signal processor and controller 80 to obtain conjugated quadratures of fields of return measurement beam components.

The advantage of the second or scanning mode is that the electrical interference signal values are acquired in a scanning mode that increases throughput of the interferometric confocal microscopy system.

The description of source 18 and beam-conditioner 22 is the same as corresponding portions of the description given for the source and beam-conditioner described in cited U.S. Provisional Patent Application No. 60/442,982 (ZI-45), U.S. patent application filed Jan. 27, 2004 (ZI-45) entitled "Interferometric Confocal Microscopy Incorporating Pinhole Array Beam-Splitter," U.S. Provisional Patent Application No. 60/442,858 (ZI-47), and U.S. patent application Ser. No. 10/765,368 filed Jan. 27, 2004 entitled "Apparatus and Method for Joint Measurements of Conjugated Quadratures of Fields of Reflected/Scattered and Transmitted Beams by an Object in Interferometry."

Figure 1D:
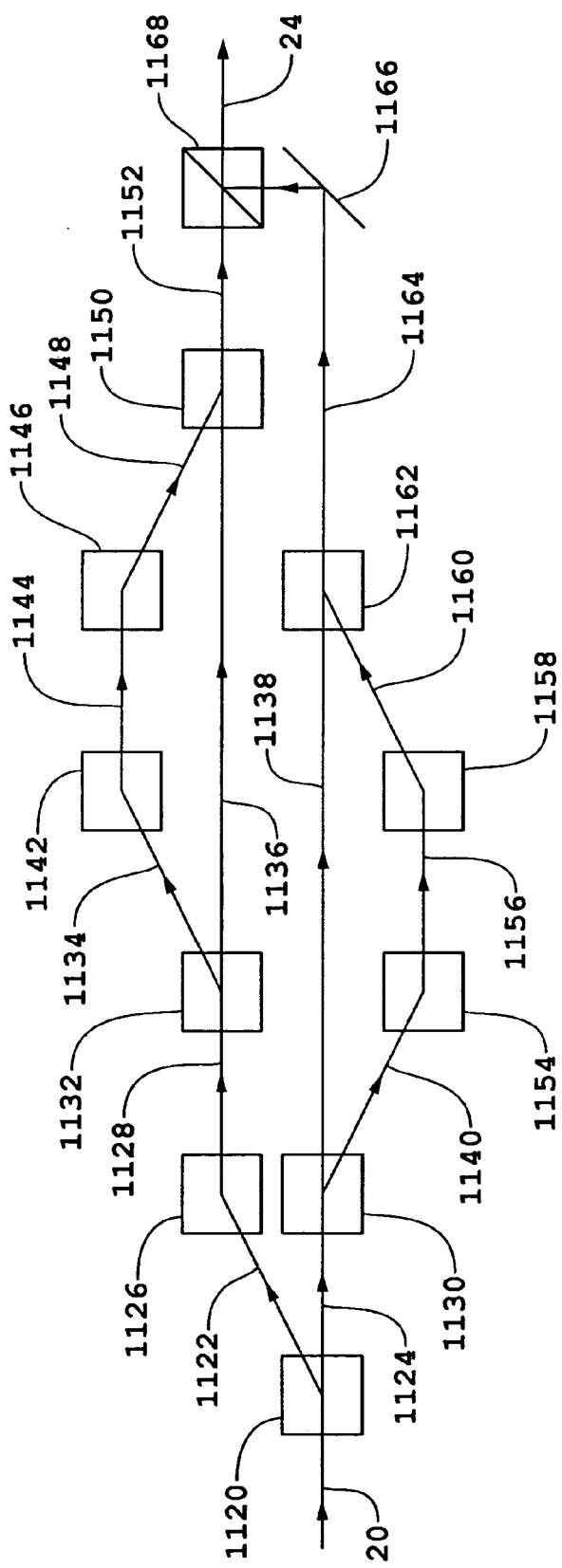
FIG. 1d is a schematic diagram of a beam-conditioner configured to operate in a two-frequency generator and frequency-shifter mode.

Reference is made to FIG. 1d where beam-conditioner 22 is first described generally as a two-frequency generator and a frequency-shifter. Beam-conditioner 22 may be operated to generate a beam 24 that has either a frequency-shifted, single frequency component or two frequency-shifted components.

Beam-conditioner 22 comprises acousto-optic modulators 1120, 1126, 1130, 1132, 1142, 1146, 1150, 1154, 1058, and 1062; beam-splitter 1168; and mirror 1166. Input beam 20 is incident on acousto-optic modulator 1120 with a plane of polarization parallel to the plane of FIG. 1d. A first portion of beam 20 is diffracted by acousto-optic modulator 1120 as beam 1122 and then by acousto-optic modulator 1126 as beam 1128 having a polarization parallel to the plane of FIG. 1d. A second portion of beam 20 is transmitted as a non-diffracted beam 1124 having a plane of polarization parallel to the plane of FIG. 1d. For beam-conditioner 22 operated to generate a frequency-shifted, single frequency component for beam 24, the acoustic power to acousto-optic modulator 1120 is switched between two states. One state is the off state where the amplitude of diffracted beam 1122 in zero and in the on state, the amplitude of non-diffracted beam 1124 is nominally zero. The on or off states of acousto-optic modulator 1120 are controlled by signal 74 generated by electronic processor and controller 80.

Acousto-optic modulators 1120 and 1126 may be of either the non-isotropic Bragg diffraction type or of the isotropic Bragg diffraction type. The frequency shifts introduced by acousto-optic modulators 1120 and 1126 are of the same sign and equal to ½ of a frequency shift $\Delta f$ that will generate in interferometer 10 a $\pi/2$ phase difference between a reference beam and a measurement beam that have a difference in frequency equal to the frequency shift $\Delta f$. The direction of propagation of beam 1128 is parallel to the direction of propagation of beam 1124.

Continuing with FIG. 1d, beam 1128 is incident on acousto-optic modulator 1132 and is either diffracted by acousto-optic modulator 1132 as beam 1134 or transmitted by acousto-optic modulator 1132 as beam 1136 according to control signal 74 from electronic processor and controller 80 (see FIG. 1a). When beam 1134 is generated, beam 1134 is diffracted by acousto-optic modulators 1142, 1146, and 1150 as a frequency shifted beam component of beam 1152. The frequency shifts introduced by acousto-optic modulators 1132, 1142, 1146, and 1150 are all in the same direction and equal in magnitude to $\Delta f/2$. Thus the net frequency shift introduced by acousto-optic modulators 1132, 1142, 1146, and 1150 is $\pm 2\Delta f$. The net frequency shift introduced by acousto-optic modulators 1120, 1126, 1132, 1142, 1146, and 1150 is $\Delta f \pm 2\Delta f$ and will generate a respective relative phase shift of $\pi/2 \pm \pi$ between the respective reference and measurement beams on transit through interferometer 10.

When beam 1136 is generated, beam 1136 is transmitted by acousto-optic modulator 1150 according to control signal 74 from electronic processor and controller 80 as a non-frequency shifted beam component of beam 1152. The net frequency shift introduced by acousto-optic modulators 1120, 1126, 1132, and 1150 is $\Delta f$ which will generate a respective relative phase shift of $\pi/2$ between the respective reference and measurement beams on transit through interferometer 10.

Beam 1124 is incident on acousto-optic modulator 1130 and is either diffracted by acousto-optic modulator 1130 as beam 1140 or transmitted by acousto-optic modulator 1130 as beam 1138 according to control signal 74 from electronic processor and controller 80. When beam 1140 is generated, beam 1140 is diffracted by acousto-optic modulators 1154, 1158, and 1162 as a frequency-shifted beam component of beam 1164. The frequency shifts introduced by acousto-optic modulators 1130, 1154, 1158, and 1162 are all in the same direction and equal to $\pm \Delta f/2$. Thus the net frequency shift introduced by acousto-optic modulators 1130, 1154, 1158, and 1162 is $\pm 2\Delta f$ and will generate a relative phase shift of $\pi$ between the respective reference and measurement beams on transit through interferometer 10. The net frequency shift introduced by acousto-optic modulators 1120, 1130, 1154, 1158, and 1162 is $\pm 2\Delta f$ and will generate a respective relative phase shift of $\pm \pi$ between the respective reference and measurement beams on transit through interferometer 10

When beam 1138 is generated, beam 1138 is transmitted by acousto-optic modulator 1162 according to control signal 74 from electronic processor and controller 80 as a non-frequency shifted beam component of beam 1164. The corresponding frequency shift introduced by acousto-optic modulators 1120, 1130, and 1162 is 0 and will generate a respective relative phase shift of 0 between the respective reference and measurement beams on transit through interferometer 10.

Beams 1152 and 1164 are next combined by beam-splitter 1168 to form beam 24. Acousto-optic modulators 1120, 1126, 1130, 1132, 1142, 1146, 1150, 1154, 1058, and 1062 may be either of the non-isotropic Bragg diffraction type or of the isotropic Bragg diffraction type. Beams 1152 and 1164 are both polarized in the plane of FIG. 1d for either non-isotropic Bragg diffraction type or of the isotropic Bragg diffraction type and beam-splitter 1168 is of the non-polarizing type.

With a continuation of the description of different ways to configure source 18 and beam-conditioner 22 to meet the input beam requirements of different embodiments, source 18 will preferably comprise a pulsed source. Each pulse of source 18 may comprise a single pulse or a train of pulses such as generated by a mode locked Q-switched Nd:YAG laser. A single pulse train is referenced herein as a pulse sequence and the expressions a pulse and a pulse sequence are used herein interchangeably.

Source 18 may be configured in certain embodiments to generate two or four frequencies by techniques such as described in a review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson in *Laser Techniques for Extreme Ultraviolet Spectroscopy*, T. J. McIlrath and R. R. Freeman, Eds. (American Institute of Physics) p 19 (1982) and references therein. The techniques include for example second and third harmonic generation and parametric generation such as described in the articles entitled "Generation of Ultraviolet and Vacuum Ultraviolet Radiation" by S. E. Harris, J. F. Young, A. H. Kung, D. M. Bloom, and G. C. Bjorklund in *Laser Spectroscopy I*, R. G. Brewer and A. Mooradi, Eds. (Plenum Press, New York) p 59, (1974) and "Generation of Tunable Picosecond VUV Radiation" by A. H. Kung, *Appl. Phys. Lett.* 25, p 653 (1974). The contents of the three cited articles are herein incorporated in their entirety by reference.

The output beam from source 18 that comprises two or four frequency components that may not be coextensive are combined in beam-conditioner 22 by beam-splitters to form coextensive measurement and reference beams that are either spatially separated or coextensive as required in various embodiments. When source 18 is configured to furnish two or four frequency components, the frequency shifting of the various components required in certain embodiments may be introduced in source 18 for example by frequency modulation of input beams to parametric generators.

The processing of the measured arrays of sets of four measured electrical interference signal values for the determination of conjugated quadratures of fields of return measurement beams is next described for the bi-homodyne detection method. The general description of the processing for bi- and quad-homodyne detection methods for the determination of joint measurements of conjugated quadratures of fields of return measurement beams is the same as the corresponding portions of the descriptions given in the cited U.S. Provisional Application No. 60/442,858 (ZI-47) and cited U.S. patent application filed Jan. 27, 2004 (ZI-47) and entitled "Apparatus and Method for Joint Measurements of Conjugated Quadratures of Fields of Reflected/Scattered and Transmitted Beams by an Object in Interferometry."

Referring to the bi-homodyne detection method wherein conjugated quadratures are obtained jointly, a set of four electrical interference signal values is obtained for each spot on and/or in substrate 60 being imaged. The set of four electrical interference signal values $S_j$, j=1,2,3,4 used for obtaining conjugated quadratures of fields for a single spot on and/or in substrate 60 being imaged is represented for the bi-homodyne detection within a scale factor by the formula $$S_j = P_j \begin{Bmatrix} \xi_j^2|A_1|^2 + \zeta_j^2|B_1|^2 + \eta_j^2|C_1|^2 + \zeta_j\eta_j 2|B_1||C_1|\cos\varphi_{B_1C_1\varepsilon_j} + \\ \xi_j\zeta_j 2|A_1||B_1|\cos\varphi_{A_1B_1\varepsilon_j} + \varepsilon_j\xi_j\eta_j 2|A_1||C_1|\cos\varphi_{A_1C_1} + \\ \xi_j^2|A_2|^2 + \zeta_j^2|B_2|^2 + \eta_j^2|C_2|^2 + \zeta_j\eta_j 2|B_2||C_2|\cos\varphi_{B_2C_2\gamma_j} + \\ \xi_j\zeta_j 2|A_2||B_2|\cos\varphi_{A_2B_2\gamma_j} + \gamma_j\xi_j\eta_j 2|A_2||C_2|\cos\varphi_{A_2C_2} \end{Bmatrix} \quad (4)$$

where coefficients $A_1$ and $A_2$ represent the amplitudes of the reference beams corresponding to first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam in pulse j; and the values for $\epsilon_j$ and $\gamma_j$ are listed in Table 1. The relative phase shifts between reference and return measurement beam for the two frequency components are an odd harmonic of $\pm\pi$. The change in the values of $\epsilon_j$ and $\gamma_j$ from 1 to −1 or from −1 to 1 correspond to changes in relative phases of an odd harmonic of $\pm\pi$ for respective reference and measurement beams associated with changes in frequencies of components of input beam 24. The coefficients $\xi_j$, $\zeta_j$, and $\eta_j$ represent effects of variations in properties of a conjugate set of four pinholes such as size and shape used in the generation of the spot on and/or in the substrate and the sensitivities of a conjugate set of four detector pixels corresponding to the spot on and/or in substrate 60 for the reference beam, the background beam, and the return measurement beam, respectively. The conjugate set of four pinholes comprise pinholes of pinhole array beam-splitter 12 that are conjugate to a spot in or on the substrate being imaged at different times during a scan.

TABLE 1

| j | $\epsilon_j$ | $\gamma_j$ | $\epsilon_j\gamma_j$ |
|---|---|---|---|
| 1 | 1 | 1 | 1 |
| 2 | −1 | −1 | 1 |
| 3 | −1 | 1 | −1 |
| 4 | 1 | −1 | −1 |

It is assumed in Equation (4) that the ratio of $|A_2|/|A_1|$ is not dependent on j or on the value of $P_j$. In order to simplify the representation of $S_j$ so as to project the important features without departing from either the scope or spirit of the present invention, it is also assumed in Equation (4) that the ratio of the amplitudes of the return measurement beams corresponding to $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos\phi_{A_2C_2} = \pm\sin\phi_{A_1C_1}$ by the control of the relative phase shifts between corresponding reference and return measurement beam components of beam components 30A and 30B, Equation (4) may be rewritten as $$S_j = P_j \begin{Bmatrix} \xi_j^2(|A_1|^2 + |A_2|^2) + \zeta_j^2(|B_1|^2 + |B_2|^2) + \\ \eta_j^2(|C_1|^2 + |C_2|^2) + 2\xi_j\zeta_j(|A_1||B_1|\cos\varphi_{A_1B_1\varepsilon_j} + \\ |A_2||B_2|\cos\varphi_{A_2C_2\gamma_j}) + 2\xi_j\eta_j\left[\varepsilon_j|A_1||C_1|\cos\varphi_{A_1C_1} + \right. \\ \left. \gamma_j\left(\frac{|A_2|}{|A_1|}\right)\left(\frac{|C_2|}{|C_1|}\right)|A_1||C_1|\sin\varphi_{A_1C_1}\right] + \\ 2\zeta_j\eta_j(\varepsilon_j|B_1||C_1|\cos\varphi_{B_1C_1\varepsilon_j} + \gamma_j|B_2||C_2|\cos\varphi_{B_2C_2\gamma_j}) \end{Bmatrix} \quad (5)$$

where the relationship $\cos\phi_{A_2C_2} = \sin\phi_{A_1C_1}$ has been used without departing from either the scope or spirit of the present invention.

The change in phase $\phi_{A_1B_1\varepsilon_j}$ for a change in $\varepsilon_j$ and the change in phase $\phi_{A_2B_2\gamma_j}$ for a change in $\gamma_j$ may be different from $\pi$ in embodiments depending on where and how the background beam is generated. It may be of value in evaluating the effects of the background beams to note that the factor $\cos\phi_{B_1C_1\varepsilon_j}$ may be written as $\cos[\phi_{A_1C_1} + (\phi_{B_1C_1\varepsilon_j} - \phi_{A_1C_1})]$ where the phase difference $(\phi_{B_1C_1\varepsilon_j} - \phi_{A_1C_1})$ is the same as the phase $\phi_{A_1B_1\varepsilon_j}$, i.e., $\cos\phi_{B_1C_1\varepsilon_j} = \cos(\phi_{A_1C_1} + \phi_{A_1B_1\varepsilon_j})$.

It is evident from inspection of Equation (5) that the term in Equation (5) corresponding to the component of conjugated quadratures $|C_1|\cos\phi_{A_1C_1}$ is a rectangular function that has a mean value of zero and is symmetric about $j=2.5$ since $\varepsilon_j$ is symmetric about $j=2.5$. In addition the term in Equation (5) corresponding to the component of conjugated quadratures $|C_1|\sin\phi_{A_1C_1}$ is a rectangular function that has a mean value of zero and is antisymmetric about $j=2.5$ since $\gamma_j$ is a antisymmetric function about $j=2.5$. Another important property by the design of the bi-homodyne detection method is that the conjugated quadratures $|C_1|\cos\phi_{A_1C_1}$ and $|C_1|\sin\phi_{A_1C_1}$ terms in Equation (5) are orthogonal over the range of $j=1,2,3,4$ since $\varepsilon_j$ and $\gamma_j$ are orthogonal over the range of $$j = 1, 2, 3, 4, \text{ i.e., } \sum_{j=1}^{4} \varepsilon_j \gamma_j = 0.$$

Information about conjugated quadratures components $|C_1|\cos\phi_{A_1C_1}$ and $|C_1|\sin\phi_{A_1C_1}$ are obtained using the symmetry property and orthogonality property of the conjugated quadratures components as represented by the following digital filters to the signals $S_j$:

$$F_1(S) = \quad (6)$$

$$\sum_{j=1}^{4} \varepsilon_j \frac{S_j}{P_j' \xi_j'^2} = (|A_1|^2 + |A_2|^2) \sum_{j=1}^{4} \varepsilon_j \left(\frac{P_j}{P_j'}\right)\left(\frac{\xi_j^2}{\xi_j'^2}\right) +$$

$$(|B_1|^2 + |B_2|^2) \sum_{j=1}^{4} \varepsilon_j \left(\frac{P_j}{P_j'}\right)\left(\frac{\zeta_j^2}{\xi_j'^2}\right) + (|C_1|^2 + |C_2|^2) \sum_{j=1}^{4} \varepsilon_j \left(\frac{P_j}{P_j'}\right)\left(\frac{\eta_j^2}{\xi_j'^2}\right) +$$

$$2|A_1||C_1|\cos\varphi_{A_1C_1} \sum_{j=1}^{4} \left(\frac{P_j}{P_j'}\right)\left(\frac{\xi_j\eta_j}{\xi_j'^2}\right) +$$

-continued $$2\left(\frac{|A_2|}{|A_1|}\right)\left(\frac{|C_2|}{|C_1|}\right)|A_1||C_1|\sin\varphi_{A_1C_1} \sum_{j=1}^{4} \varepsilon_j\gamma_j\left(\frac{P_j}{P_j'}\right)\left(\frac{\xi_j\eta_j}{\xi_j'^2}\right) +$$

$$2|A_1||B_1|\sum_{j=1}^{4} \varepsilon_j\left(\frac{P_j}{P_j'}\right)\left(\frac{\xi_j\zeta_j}{\xi_j'^2}\right)\cos\varphi_{A_1B_1\varepsilon_j} +$$

$$2|A_2||B_2|\sum_{j=1}^{4} \varepsilon_j\left(\frac{P_j}{P_j'}\right)\left(\frac{\xi_j\zeta_j}{\xi_j'^2}\right)\cos\varphi_{A_2B_2\gamma_j} +$$

$$2|B_1||C_1|\sum_{j=1}^{4} \varepsilon_j\left(\frac{P_j}{P_j'}\right)\left(\frac{\zeta_j\eta_j}{\xi_j'^2}\right)\cos\varphi_{B_1C_1\varepsilon_j} +$$

$$2|B_2||C_2|\sum_{j=1}^{4} \varepsilon_j\gamma_j\left(\frac{P_j}{P_j'}\right)\left(\frac{\zeta_j\eta_j}{\xi_j'^2}\right)\cos\varphi_{B_2C_2\gamma_j},$$

and $$F_2(S) = \quad (7)$$

$$\sum_{j=1}^{4} \gamma_j \frac{S_j}{P_j' \xi_j'^2} = (|A_1|^2 + |A_2|^2) \sum_{j=1}^{4} \gamma_j \left(\frac{P_j}{P_j'}\right)\left(\frac{\xi_j^2}{\xi_j'^2}\right) +$$

$$(|B_1|^2 + |B_2|^2) \sum_{j=1}^{4} \gamma_j \left(\frac{P_j}{P_j'}\right)\left(\frac{\zeta_j^2}{\xi_j'^2}\right) + (|C_1|^2 + |C_2|^2) \sum_{j=1}^{4} \gamma_j \left(\frac{P_j}{P_j'}\right)\left(\frac{\eta_j^2}{\xi_j'^2}\right) +$$

$$2|A_1||C_1|\cos\varphi_{A_1C_1} \sum_{j=1}^{4} \varepsilon_j\gamma_j\left(\frac{P_j}{P_j'}\right)\left(\frac{\xi_j\eta_j}{\xi_j'^2}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \left(\frac{P_j}{P_j'}\right)\left(\frac{\xi_j\eta_j}{\xi_j'^2}\right) +$$

$$2|A_1||B_1|\sum_{j=1}^{4} \gamma_j\left(\frac{P_j}{P_j'}\right)\left(\frac{\xi_j\zeta_j}{\xi_j'^2}\right)\cos\varphi_{A_1B_1\varepsilon_j} +$$

$$2|A_2||B_2|\sum_{j=1}^{4} \gamma_j\left(\frac{P_j}{P_j'}\right)\left(\frac{\xi_j\zeta_j}{\xi_j'^2}\right)\cos\varphi_{A_2B_2\gamma_j} +$$

$$2|B_1||C_1|\sum_{j=1}^{4} \varepsilon_j\gamma_j\left(\frac{P_j}{P_j'}\right)\left(\frac{\zeta_j\eta_j}{\xi_j'^2}\right)\cos\varphi_{B_1C_1\varepsilon_j} +$$

$$2|B_2||C_2|\sum_{j=1}^{4} \left(\frac{P_j}{P_j'}\right)\left(\frac{\zeta_j\eta_j}{\xi_j'^2}\right)\cos\varphi_{B_2C_2\gamma_j}$$

$\xi_j'$ and $P_j'$ are values used in the digital filters to represent $\xi_j$ and $P_j$.

The parameter $$\left[\left(\frac{|A_2|}{|A_1|}\right)\left(\frac{|C_2|}{|C_1|}\right)\right] \quad (8)$$

in Equations (6) and (7) needs to be determined in order complete the determination of a conjugated quadratures The parameter given in Equation (8) can be measured for example by introducing $\pi/2$ phase shifts into the relative phase of the reference beam and the measurement beam and repeating the measurement for the conjugated quadratures.

The ratio of the amplitudes of the conjugated quadratures corresponding to (sin $\phi_{A_1C_1}$/cos $\phi_{A_1C_1}$) from the first measurement divided by the ratio of the amplitudes of the conjugated quadratures corresponding to (sin $\phi_{A_1C_1}$/cos $\phi_{A_1C_1}$) from the second measurement is equal to $$\left[\left(\frac{|A_2|}{|A_1|}\right)\left(\frac{|C_2|}{|C_1|}\right)\right]^2. \tag{9}$$

Note that certain of the factors in Equations (6) and (7) have nominal values of 4 within a scale factors, e.g., $$\sum_{j=1}^{4}\left(\frac{P_j}{P'_j}\right)\left(\frac{\xi_j\eta_j}{\xi'^2_j}\right) \simeq 4, \quad \sum_{j=1}^{4}\left(\frac{P_j}{P'_j}\right)\left(\frac{\zeta_j\eta_j}{\xi'^2_j}\right) \simeq 4. \tag{10}$$

The scale factors correspond to the average values for the ratios of $\xi'_j/\eta_j$ and $\xi'_j/\zeta_j$, respectively, assuming that the average value of $P_j/P'_j \cong 1$. Certain other of the factors in Equations (6) and (7) have nominal values of zero, e.g., $$\sum_{j=1}^{4}\varepsilon_j\left(\frac{P_j}{P'_j}\right)\left(\frac{\xi_j^2}{\xi'^2_j}\right) \simeq 0, \quad \sum_{j=1}^{4}\varepsilon_j\left(\frac{P_j}{P'_j}\right)\left(\frac{\zeta_j^2}{\xi'^2_j}\right) \simeq 0, \tag{11}$$

$$\sum_{j=1}^{4}\varepsilon_j\left(\frac{P_j}{P'_j}\right)\left(\frac{\eta_j^2}{\xi'^2_j}\right) \simeq 0,$$

$$\sum_{j=1}^{4}\gamma_j\left(\frac{P_j}{P'_j}\right)\left(\frac{\xi_j^2}{\xi'^2_j}\right) \simeq 0, \quad \sum_{j=1}^{4}\gamma_j\left(\frac{P_j}{P'_j}\right)\left(\frac{\zeta_j^2}{\xi'^2_j}\right) \simeq 0,$$

$$\sum_{j=1}^{4}\gamma_j\left(\frac{P_j}{P'_j}\right)\left(\frac{\eta_j^2}{\xi'^2_j}\right) \simeq 0,$$

$$\sum_{j=1}^{4}\varepsilon_j\gamma_j\left(\frac{P_j}{P'_j}\right)\left(\frac{\xi_j\eta_j}{\xi'^2_j}\right) \simeq 0.$$

The remaining factors, $$\sum_{j=1}^{4}\varepsilon_j\left(\frac{P_j}{P'_j}\right)\left(\frac{\xi_j\zeta_j}{\xi'^2_j}\right)\cos\varphi_{A_1B_1\varepsilon_j}, \quad \sum_{j=1}^{4}\varepsilon_j\left(\frac{P_j}{P'_j}\right)\left(\frac{\xi_j\zeta_j}{\xi'^2_j}\right)\cos\varphi_{A_2B_2\gamma_j}, \tag{12}$$

$$\sum_{j=1}^{4}\left(\frac{P_j}{P'_j}\right)\left(\frac{\zeta_j\eta_j}{\xi'^2_j}\right)\cos\varphi_{B_1C_1\varepsilon_j}, \quad \sum_{j=1}^{4}\varepsilon_j\gamma_j\left(\frac{P_j}{P'_j}\right)\left(\frac{\zeta_j\eta_j}{\xi'^2_j}\right)\cos\varphi_{B_2C_2\gamma_j},$$

$$\sum_{j=1}^{4}\gamma_j\left(\frac{P_j}{P'_j}\right)\left(\frac{\xi_j\zeta_j}{\xi'^2_j}\right)\cos\varphi_{A_1B_1\varepsilon_j}, \quad \sum_{j=1}^{4}\gamma_j\left(\frac{P_j}{P'_j}\right)\left(\frac{\xi_j\zeta_j}{\xi'^2_j}\right)\cos\varphi_{A_2B_2\gamma_j},$$

$$\sum_{j=1}^{4}\varepsilon_j\gamma_j\left(\frac{P_j}{P'_j}\right)\left(\frac{\zeta_j\eta_j}{\xi'^2_j}\right)\cos\varphi_{B_1C_1\varepsilon_j}, \quad \sum_{j=1}^{4}\left(\frac{P_j}{P'_j}\right)\left(\frac{\zeta_j\eta_j}{\xi'^2_j}\right)\cos\varphi_{B_2C_2\gamma_j},$$

will have nominal magnitudes ranging from approximately zero to approximately 4 times a cosine factor and either the average value of factor $(P_j/P'_j)(\xi_j\zeta_j/\xi'^2_j)$ or $(P_j/P'_j)(\zeta_j\eta_j/\xi'^2_j)$ depending on the properties respective phases. For the portion of the background with phases that do not track to a first approximation the phases of the respective measurement beams, the magnitudes of all of the terms listed in the Equation (12) will be approximately zero. For the portion of the background with phases that do track to a first approximation the phases of the respective measurement beams, the magnitudes of the terms listed in Equation (12) will be approximately 4 times a cosine factor and either the average value of factor $(P_j/P'_j)(\xi_j\zeta_j/\xi'^2_j)$ and or factor $(P_j/P'_j)(\zeta_j\eta_j/\xi'^2_j)$. The two largest terms in Equations (6) and (7) are generally the terms that have the factors $(|A_1|^2+|A_2|^2)$ and $(|B_1|^2+|B_2|^2)$. However, the corresponding terms are substantially eliminated in various embodiments by selection of $\xi'_j$ values for the terms that have $(|A_1|^2+|A_2|^2)$ as a factor and by the design of $\zeta_j$ values for the terms that have $(|B_1|^2+|B_2|^2)$ as a factor as shown in Equation (11).

The largest contribution from effects of background is represented by the contribution to the interference term between the reference beam and the portion of the background beam generated by the measurement beam. This portion of the effect of the background can be measured in various embodiments by measuring the corresponding conjugated quadratures of the portion of the background with the return measurement beam component of output beam components 30A and 30B set equal to zero, i.e., measuring the respective electrical interference signals $S_j$ with substrate 60 removed and with either $|A_2|=0$ or $|A_1|=0$ and visa versa. The measured conjugated quadratures of the portion of the effect of the background can than used to compensate for the respective background effects beneficially in an end use application if required.

Information about the largest contribution from effects of background amplitude $\xi_j\zeta_j2A_1B_1$ and phase $\phi_{A_1B_1\varepsilon_j}$ of the interference term between the reference beam and the background beam generated by the measurement beam may be obtained by measuring $S_j$ for j=1,2,3,4 as a function of relative phase shift between reference beam and the measurement beam with substrate 60 removed and either $|A_2|=0$ or $|A_1|=0$ and visa versa and Fourier analyzing the measured values of $S_j$. Such information can be used to help identify the origin of the respective background.

Other techniques may be incorporated into embodiments to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of three patents are by Henry A. Hill. The contents of each of the three cited patents are herein incorporated in their entirety by reference.

The selection of values for $\xi'_j$ is based on information about coefficients $\xi_j$ for j=1,2,3,4 that may be obtained by measuring the $S_j$ for j=1,2,3,4 with only the reference beam present in the interferometer system. In certain embodiments, this may correspond simply blocking the measurement beam components of input beam 24 and in certain other embodiments, this may correspond to simply measuring the $S_j$ for j=1,2,3,4 with substrate 60 removed. A test of the correctness of a set of values for $\xi'_j$ is the degree to which the $(|A_1|^2+|A_2|^2)$ terms in Equations (6) and (7) are zero.

Information about coefficients $\xi_j \eta_j$ for j=1,2,3,4 may be obtained by scanning an artifact past the spots corresponding to the respective four conjugate detector pixels with either $|A_2|=0$ or $|A_1|=0$ and measuring the conjugated quadratures component $2|A_1||C_1| \cos \phi_{A_1C_1}$ or $2|A_1||C_1| \sin \phi_{A_1C_1}$, respectively. A change in the amplitude of $2|A_1||C_1| \cos \phi_{A_1C_1}$ or $2|A_1||C_1| \sin \phi_{A_1C_1}$ term corresponds to a variation in $\xi_j \eta_j$ as a function of j. Information about the coefficients $\xi_j \eta_j$ for j=1,2,3,4 may be used for example to monitor the stability of one or more elements of interferometer system 10.

The bi-homodyne detection method is a robust technique for the determination of conjugated quadratures of fields. First, the conjugated quadratures amplitudes $|C_1| \cos \phi_{A_1C_1}$ and $|C_1| \sin \phi_{A_1C_1}$ are the primary terms in the digitally filtered values $F_1(S)$ and $F_2(S)$, respectively, as expressed by Equations (6) and (7), respectively, since as noted in the discussion with respect to Equation (11), the terms with the factors $(|A_1|^2+|A_2|^2)$ and $(|B_1|^2+|B_2|^2)$ are substantially zero.

Secondly, the coefficients of $|C_1| \cos \phi_{A_1C_1}$ and $|C_2| \sin \phi_{A_1C_1}$ terms in Equations (6) and (7) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi_j'^2)$ enter in only second or higher order. This property translates into a significant advantage. Also, the contributions to each component of the conjugated quadratures $|C_1| \cos \phi_{A_1C_1}$ and $|C_1| \sin \phi_{A_1C_1}$ from a respective set of four electrical interference signal values have the same window function and thus are obtained as jointly determined values.

Other distinguishing features of the bi-homodyne technique are evident in Equations (6) and (7): the coefficients of the conjugated quadratures components $|C_1| \cos \phi_{A_1C_1}$ and $|C_1| \sin \phi_{A_1C_1}$ in Equations (6) and (7), respectively, and listed as the first equation in Equations (10) are identical independent of errors in assumed values for $\xi_j'$; the coefficients of the conjugated quadratures amplitudes $|C_1| \sin \phi_{A_1C_1}$ and $|C_1| \cos \phi_{A_1C_1}$ in Equations (6) and (7), respectively, and listed as the last equation in Equations (11) are identical independent of errors in assumed values for $\xi_j'$. Thus highly accurate values of the phases corresponding to conjugated quadratures can be measured with first order variations in $\xi_j$ and first order errors in normalizations such as $(P_j/P'_j)$ and $(\xi_j^2/\xi_j'^2)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

The description of processing used in the single-homodyne detection method which may be considered a special case of bi-homodyne detection method is also the same as the description given for the bi-homodyne detection with either of the amplitudes $A_2$ or $A_1$ set equal to zero except that the conjugated quadratures obtained in the special case are not obtained as jointly measured quantities.

The first embodiment measures conjugated quadratures of fields reflected and/or scattered by a substrate using an interferometric confocal microscopy system and the single-homodyne detection method with effects of a mismatch in indices of refraction at the substrate surface and adjacent medium compensated. The first embodiment comprises catadioptric imaging system 10 and secondary imaging system 110 as described herein with source 18 and beam-conditioner 22 configured to generate input beam 24 with a single frequency component. The data processing procedure used in the single-homodyne detection method to extract the conjugated quadratures of the reflected and/or scattered return measurement beam is same as described for example in cited U.S. Pat. No. 6,445,453 (ZI-14). The mismatch in indices of refraction at the substrate surface and adjacent medium are compensated by the procedure described herein with respect to FIG. 1c.

In the first embodiment, multi-pixel detector 70 may comprise a frame transfer CCD that is configured such that one set of CCD pixel signal values may be generated and subsequently stored on the CCD wafer while a frame of a second set of CCD pixel signal values may be generated before a readout of both the first and second set of the CCD signal values is made. The time required to store the first set of CCD signal values is generally much less than the time required to readout a set of CCD signal values for a frame transfer CCD. Thus, the advantage of the use of a frame transfer CCD is that the time between two consecutive pulses of input beam 20 and the corresponding time between measurements of electrical interference signal values can be much less than when using a non-frame transfer CCD.

A second embodiment is described that makes joint measurements of conjugated quadratures of fields reflected and/or scattered by a substrate using an interferometric confocal microscopy system and the bi-homodyne detection method with effects of a mismatch in indices of refraction at the substrate surface and adjacent medium compensated. The second embodiment comprises the interferometric confocal microscopy system of the first embodiment operated for joint measurement of conjugated quadratures using the bi-homodyne detection method with source 18 and beam-conditioner 22 configured to generate input beam 24 with a two frequency-shifted components. The mismatch in indices of refraction at the substrate surface and adjacent medium are compensated by the procedure described herein with respect to FIG. 1c. The data processing procedure used in the bi-homodyne detection method to extract joint measurements of the conjugated quadratures of the reflected and/or scattered return measurement beam is same as described herein. to For generation of two frequency-shifted components of beam 24 in the second embodiment, the acoustic power to acousto-optic modulator 1120 (see FIG. 1d) is adjusted so that the intensity of diffracted beam 1122 and the intensity of non-diffracted beam 1124 are the same. The level of acoustic power in acousto-optic modulator 1120 is controlled by signal 74 generated by electronic processor and controller 80.

The remaining description of the second embodiment is the same as corresponding portions of the description given of the first embodiment.

A third embodiment measures conjugated quadratures of fields reflected and/or scattered by a substrate using an interferometric confocal microscopy system and a variant of the single-homodyne detection method with effects of a mismatch in indices of refraction at the substrate surface and adjacent medium compensated. The third embodiment comprises the interferometric confocal microscopy system of the first embodiment with a variant of microscope 120 of the first embodiment with source 18 and beam-conditioner 22 configured to generate input beam 24 with a two frequency-shifted components. The mismatch in indices of refraction at the substrate surface and adjacent medium are compensated by the procedure described herein with respect to FIG. 1c.

The variant of microscope 120 comprises a dispersive element such as described in cited U.S. Provisional Patent Application No. 60/442,982 (ZI-45) and U.S. patent application filed Jan. 27, 2004 (ZI-45) entitled "Interferometric Confocal Microscopy Incorporating Pinhole Hole Array Beam-Splitter" such that the components of two frequency components of output beam 32 are directed to two mutually exclusive subsets of detector 70.

The third embodiment obtains non-joint measurements of conjugated quadratures of fields of measurement beams reflected and/or scattered by a substrate 60 using the variant of the single-homodyne detection method. The variant of the single-homodyne detection method acquires a set of four arrays of electrical interference signal values in two read out cycles instead of in four read out cycles such as with the single-homodyne detection method which is an advantage. However as noted, the respective measurements of the conjugated quadratures are not jointly acquired measurements of the conjugated quadratures which is a property shared with the single-homodyne detection method. The data processing procedure used in the variant of the single-homodyne detection method to extract the conjugated quadratures of the reflected and/or scattered return measurement beam is same as described for the date processing procedure for the single-homodyne detection method used in the first embodiment.

The difference in frequencies of components of output beam components 30A and 30B corresponding to amplitudes $A_1$ and $A_2$ is chosen in conjunction with the design of the dispersion of the dispersive element in the variant of microscope 120 such that the $A_1$ and its corresponding components and $A_2$ and its corresponding components of output beam components 30A and 30B are directed to two different mutually exclusive sets of pixels of detector 70.

The remaining description of the third embodiment is the same as corresponding portions of the description given of the first embodiment.

A variant of the third embodiment makes joint measurements of conjugated quadratures of fields reflected and/or scattered by a substrate using an interferometric confocal microscopy system and the quad-homodyne detection method with effects of a mismatch in indices of refraction at the substrate surface and adjacent medium compensated. The variant of the third embodiment comprises the interferometric confocal microscopy system of the third embodiment with source 18 and beam-conditioner 22 configured to generate input beam 24 with four frequency components and the design of the dispersion of the dispersive element and the selection of the four frequencies such that the components of output beam 32 corresponding to two of the four frequency components are directed to one subset of pixels of detector 70 and the components of output beam 32 corresponding to two other of the four frequency components are directed to a second mutually exclusive subset of pixels of detector 70. Each pixel of the two subsets of pixels receives simultaneously two frequency components. The mismatch in indices of refraction at the substrate surface and adjacent medium are compensated by the procedure described herein with respect to FIG. 1c.

Referring to the quad-homodyne detection used in the variant of the third embodiment and other embodiments, a set of four electrical interference signal values are obtained for each spot on and/or in substrate 60 being imaged with two read out cycles or with two pulse sequences from source 18 and beam-conditioner 22. The set of four electrical interference signals $S_j$, $j=1,2,3,4$ used for obtaining conjugated quadratures of fields for a single a spot on and/or in a substrate being imaged is represented within a scale factor for the quad-homodyne detection by the formulae $$S_1 = P_1 \begin{cases} \xi_1^2|A_1|^2 + \zeta_1^2|B_1|^2 + \eta_1^2|C_1|^2 + \zeta_1\eta_12|B_1||C_1|\cos\varphi_{B_1C_1\varepsilon_1} + \\ \xi_1\zeta_12|A_1||B_1|\cos\varphi_{A_1B_1\varepsilon_1} + \varepsilon_1\xi_1\eta_12|A_1||C_1|\cos\varphi_{A_1C_1} + \\ \xi_1^2|A_2|^2 + \zeta_1^2|B_2|^2 + \eta_1^2|C_2|^2 + \zeta_1\eta_12|B_2||C_2|\cos\varphi_{B_2C_2\gamma_1} + \\ \xi_1\zeta_12|A_2||B_2|\cos\varphi_{A_2B_2\gamma_1} + \gamma_1\xi_1\eta_12|A_2||C_2|\cos\varphi_{A_2C_2} \end{cases}, \quad (13)$$

$$S_2 = P_1 \begin{cases} \xi_2^2|A_3|^2 + \zeta_2^2|B_3|^2 + \eta_2^2|C_3|^2 + \zeta_2\eta_22|B_3||C_3|\cos\varphi_{B_3C_3\varepsilon_2} + \\ \xi_2\zeta_22|A_3||B_3|\cos\varphi_{A_3B_3\varepsilon_2} + \varepsilon_2\xi_2\eta_22|A_3||C_3|\cos\varphi_{A_3C_3} + \\ \xi_2^2|A_4|^2 + \zeta_2^2|B_4|^2 + \eta_2^2|C_4|^2 + \zeta_2\eta_22|B_4||C_4|\cos\varphi_{B_4C_4\gamma_2} + \\ \xi_2\zeta_22|A_4||B_4|\cos\varphi_{A_4B_4\gamma_2} + \gamma_2\xi_2\eta_22|A_4||C_4|\cos\varphi_{A_4C_4} \end{cases}, \quad (14)$$

$$S_3 = P_2 \begin{cases} \xi_1^2|A_1|^2 + \zeta_1^2|B_1|^2 + \eta_1^2|C_1|^2 + \zeta_1\eta_12|B_1||C_1|\cos\varphi_{B_1C_1\varepsilon_3} + \\ \xi_1\zeta_12|A_1||B_1|\cos\varphi_{A_1B_1\varepsilon_3} + \varepsilon_3\xi_1\eta_12|A_1||C_1|\cos\varphi_{A_1C_1} + \\ \xi_1^2|A_2|^2 + \zeta_1^2|B_2|^2 + \eta_1^2|C_2|^2 + \zeta_1\eta_12|B_2||C_2|\cos\varphi_{B_2C_2\gamma_3} + \\ \xi_1\zeta_12|A_2||B_2|\cos\varphi_{A_2B_2\gamma_3} + \gamma_3\xi_1\eta_12|A_2||C_2|\cos\varphi_{A_2C_2} \end{cases}, \quad (15)$$

$$S_4 = P_2 \begin{cases} \xi_2^2|A_3|^2 + \zeta_2^2|B_3|^2 + \eta_2^2|C_3|^2 + \zeta_2\eta_22|B_3||C_3|\cos\varphi_{B_3C_3\varepsilon_4} + \\ \xi_2\zeta_22|A_3||B_3|\cos\varphi_{A_3B_3\varepsilon_4} + \varepsilon_4\xi_2\eta_22|A_3||C_3|\cos\varphi_{A_3C_3} + \\ \xi_2^2|A_4|^2 + \zeta_2^2|B_4|^2 + \eta_2^2|C_4|^2 + \zeta_2\eta_22|B_4||C_4|\cos\varphi_{B_4C_4\gamma_4} + \\ \xi_2\zeta_22|A_4||B_4|\cos\varphi_{A_4B_4\gamma_4} + \gamma_4\xi_2\eta_22|A_4||C_4|\cos\varphi_{A_4C_4} \end{cases}, \quad (16)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second pulse sequences, respectively, of the input beam 24; and the values for $\epsilon_j$ and $\gamma_j$ are listed in Table 1. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Equations (13), (14), (15), and (16) that the ratios of $|A_2|/|A_1|$ and $|A_4|/|A_3|$ are not dependent on j or the value of $P_j$. In order to simplify the representation of $S_j$ so as to project the important features without departing from either the scope or spirit of the present invention, it is also assumed in Equations (13), (14), (15), and (16) that the ratios of the amplitudes of the return measurement beams corresponding to $|A_2|/|A_1|$ and $|A_4|/|A_3|$ are not dependent on j or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that $\cos\phi_{A_2C_2} = \pm\sin\phi_{A_1C_1}$ by the control of the relative phase shifts between corresponding reference and measurement beam components in beam 32, Equations (13), (14), (15), and (16) may be written, respectively, as $$S_1 = P_1 \begin{Bmatrix} \xi_1^2(|A_1|^2+|A_2|^2)+\zeta_1^2(|B_1|^2+|B_2|^2)+\eta_1^2(|C_1|^2+|C_2|^2)+ \\ 2\zeta_1\eta_1[|B_1||C_1|\cos\varphi_{B_1C_1\varepsilon_1}+|B_2||C_2|\cos\varphi_{B_2C_2\gamma_1}]+ \\ 2\xi_1\eta_1 \begin{bmatrix} \varepsilon_1|A_1||C_1|\cos\varphi_{A_1C_1}+ \\ \gamma_1\left(\frac{|A_2|}{|A_1|}\right)\left(\frac{|C_2|}{|C_1|}\right)|A_1||C_1|\sin\varphi_{A_1C_1} \end{bmatrix} + \\ 2\xi_1\zeta_1[|A_1||B_1|\cos\varphi_{A_1B_1\varepsilon_1}+|A_2||B_2|\cos\varphi_{A_2B_2\gamma_1}] \end{Bmatrix}, \quad (17)$$

$$S_2 = P_1 \begin{Bmatrix} \xi_2^2(|A_3|^2+|A_4|^2)+\zeta_2^2(|B_3|^2+|B_4|^2)+\eta_2^2(|C_3|^2+|C_4|^2)+ \\ 2\zeta_2\eta_2[|B_3||C_3|\cos\varphi_{B_3C_3\varepsilon_2}+|B_4||C_4|\cos\varphi_{B_4C_4\gamma_2}]+ \\ 2\xi_2\eta_2\left(\frac{|A_3|}{|A_1|}\right)\left(\frac{|C_3|}{|C_1|}\right) \begin{bmatrix} \varepsilon_2|A_1||C_1|\cos\varphi_{A_1C_1}+ \\ \gamma_2\left(\frac{|A_4|}{|A_3|}\right)\left(\frac{|C_4|}{|C_3|}\right)|A_1||C_1|\sin\varphi_{A_1C_1} \end{bmatrix} + \\ 2\xi_2\zeta_2[|A_3||B_3|\cos\varphi_{A_3B_3\varepsilon_2}+|A_4||B_4|\cos\varphi_{A_4B_4\gamma_2}] \end{Bmatrix}, \quad (18)$$

$$S_3 = P_2 \begin{Bmatrix} \xi_1^2(|A_1|^2+|A_2|^2)+\zeta_1^2(|B_1|^2+|B_2|^2)+\eta_1^2(|C_1|^2+|C_2|^2)+ \\ 2\zeta_1\eta_1[|B_1||C_1|\cos\varphi_{B_1C_1\varepsilon_3}+|B_2||C_2|\cos\varphi_{B_2C_2\gamma_3}]+ \\ 2\xi_1\eta_1 \begin{bmatrix} \varepsilon_3|A_1||C_1|\cos\varphi_{A_1C_1}+ \\ \gamma_3\left(\frac{|A_2|}{|A_1|}\right)\left(\frac{|C_2|}{|C_1|}\right)|A_1||C_1|\sin\varphi_{A_1C_1} \end{bmatrix} + \\ 2\xi_1\zeta_1[|A_1||B_1|\cos\varphi_{A_1B_1\varepsilon_3}+|A_2||B_2|\cos\varphi_{A_2B_2\gamma_3}] \end{Bmatrix}, \quad (19)$$

$$S_4 = P_2 \begin{Bmatrix} \xi_2^2(|A_3|^2+|A_4|^2)+\zeta_2^2(|B_3|^2+|B_4|^2)+\eta_2^2(|C_3|^2+|C_4|^2)+ \\ 2\zeta_2\eta_2[|B_3||C_3|\cos\varphi_{B_3C_3\varepsilon_4}+|B_4||C_4|\cos\varphi_{B_4C_4\gamma_4}]+ \\ 2\xi_2\eta_2\left(\frac{|A_3|}{|A_1|}\right)\left(\frac{|C_3|}{|C_1|}\right) \begin{bmatrix} \varepsilon_4|A_1||C_1|\cos\varphi_{A_1C_1}+ \\ \gamma_4\left(\frac{|A_4|}{|A_3|}\right)\left(\frac{|C_4|}{|C_3|}\right)|A_1||C_1|\sin\varphi_{A_1C_1} \end{bmatrix} + \\ 2\xi_2\zeta_2[|A_3||B_3|\cos\varphi_{A_3B_3\varepsilon_4}+|A_4||B_4|\cos\varphi_{A_4B_4\gamma_4}] \end{Bmatrix}, \quad (20)$$

where the relationship $\cos\phi_{A_2C_2}=\sin\phi_{A_1C_1}$ has been used without departing from either the scope or spirit of the present invention.

Information about the conjugated quadratures $|C_1|\cos\phi_{A_1C_1}$ and $|C_1|\sin\phi_{A_1C_1}$ are obtained using the symmetric and antisymmetric properties and orthogonality property of the conjugated quadratures as represented by the following digital filters applied to the signal values $S_j$ for $j=1,2,3,4$:

$$F_3(S) = \left(\frac{1}{P_1'}\right)\left(\frac{S_1}{\xi_1'^2}-\frac{S_2}{\xi_2'^2}\right)-\left(\frac{1}{P_2'}\right)\left(\frac{S_3}{\xi_1'^2}-\frac{S_4}{\xi_2'^2}\right), \quad (21)$$

$$F_4(S) = \left(\frac{1}{P_1'}\right)\left(\frac{S_1}{\xi_1'^2}-\frac{S_2}{\xi_2'^2}\right)+\left(\frac{1}{P_2'}\right)\left(\frac{S_3}{\xi_1'^2}-\frac{S_4}{\xi_2'^2}\right). \quad (22)$$

The description of $\xi_j'$ and $P_j'$ for the quad-homodyne detection method is the same as the corresponding description given for $\xi_j'$ and $P_j'$ in the bi-homodyne detection method. Using Equations (17), (18), (19), (20), (21), and (22), the following expressions are obtained for the components of the conjugated quadratures $|C_1|\cos\phi_{A_1C_1}$ and $|C_1|\sin\phi_{A_1C_1}$, respectively:

$$F_3(S) = \left(\frac{P_1}{P_1'}-\frac{P_2}{P_2'}\right)\left[(|A_1|^2+|A_2|^2)\left(\frac{\xi_1^2}{\xi_1'^2}\right)-(|A_3|^2+|A_4|^2)\left(\frac{\xi_2^2}{\xi_2'^2}\right)\right]+ \quad (23)$$

$$\left(\frac{P_1}{P_1'}-\frac{P_2}{P_2'}\right)\left[(|B_1|^2+|B_2|^2)\left(\frac{\xi_1^2}{\xi_1'^2}\right)-(|B_3|^2+|B_4|^2)\left(\frac{\xi_2^2}{\xi_2'^2}\right)\right]+$$

$$\left(\frac{P_1}{P_1'}-\frac{P_2}{P_2'}\right)\left[(|C_1|^2+|C_2|^2)\left(\frac{\eta_1^2}{\xi_1'^2}\right)-(|C_3|^2+|C_4|^2)\left(\frac{\eta_2^2}{\xi_2'^2}\right)\right]+$$

$$2\left(\frac{P_1}{P_1'}+\frac{P_2}{P_2'}\right)\left[\left(\frac{\xi_1\eta_1}{\xi_1'^2}\right)+\left(\frac{\xi_2\eta_2}{\xi_2'^2}\right)\left(\frac{|A_3|}{|A_1|}\right)\left(\frac{|C_3|}{|C_1|}\right)\right]$$

$$|A_1||C_1|\cos\varphi_{A_1C_1}+$$

$$2\left(\frac{P_1}{P_1'}-\frac{P_2}{P_2'}\right)\left(\frac{|A_2|}{|A_1|}\right)\left(\frac{|C_2|}{|C_1|}\right)\left[\begin{array}{c}\left(\frac{\xi_1\eta_1}{\xi_1'^2}\right)+\\ \left(\frac{\xi_2\eta_2}{\xi_2'^2}\right)\left(\frac{|A_4|}{|A_2|}\right)\left(\frac{|C_4|}{|C_2|}\right)\end{array}\right]$$

$$|A_1||C_1|\sin\varphi_{A_1C_1}+$$

$$2\left(\frac{P_1}{P_1'}\cos\varphi_{A_1B_1\varepsilon_1}-\frac{P_2}{P_2'}\cos\varphi_{A_1B_1\varepsilon_3}\right)\frac{\xi_1\zeta_1}{\xi_1'^2}|A_1||B_1|-$$

$$2\left(\frac{P_1}{P_1'}\cos\varphi_{A_3B_3\varepsilon_2}-\frac{P_2}{P_2'}\cos\varphi_{A_3B_3\varepsilon_4}\right)\frac{\xi_2\zeta_2}{\xi_2'^2}|A_3||B_3|+$$

$$2\left(\frac{P_1}{P_1'}\cos\varphi_{A_2B_2\gamma_1}-\frac{P_2}{P_2'}\cos\varphi_{A_2B_2\gamma_3}\right)\frac{\xi_1\zeta_1}{\xi_1'^2}|A_2||B_2|-$$

$$2\left(\frac{P_1}{P_1'}\cos\varphi_{A_4B_4\gamma_2}-\frac{P_2}{P_2'}\cos\varphi_{A_4B_4\gamma_4}\right)\frac{\xi_2\zeta_2}{\xi_2'^2}|A_4||B_4|+$$

$$2\left(\frac{P_1}{P_1'}\cos\varphi_{B_1C_1\varepsilon_1}-\frac{P_2}{P_2'}\cos\varphi_{B_1C_1\varepsilon_3}\right)\frac{\xi_1\zeta_1}{\xi_1'^2}|B_1||C_1|-$$

$$2\left(\frac{P_1}{P_1'}\cos\varphi_{B_3C_3\varepsilon_2}-\frac{P_2}{P_2'}\cos\varphi_{B_3C_3\varepsilon_4}\right)\frac{\xi_2\zeta_2}{\xi_2'^2}|B_3||C_3|+$$

$$2\left(\frac{P_1}{P_1'}\cos\varphi_{B_2C_2\gamma_1}-\frac{P_2}{P_2'}\cos\varphi_{B_2C_2\gamma_3}\right)\frac{\xi_1\zeta_1}{\xi_1'^2}|B_2||C_2|-$$

$$2\left(\frac{P_1}{P_1'}\cos\varphi_{B_4C_4\gamma_2}-\frac{P_2}{P_2'}\cos\varphi_{B_4C_4\gamma_4}\right)\frac{\xi_2\zeta_2}{\xi_2'^2}|B_4||C_4|,$$

$$F_4(S) = \left(\frac{P_1}{P_1'}+\frac{P_2}{P_2'}\right)\left[(|A_1|^2+|A_2|^2)\left(\frac{\xi_1^2}{\xi_1'^2}\right)-(|A_3|^2+|A_4|^2)\left(\frac{\xi_2^2}{\xi_2'^2}\right)\right]+ \quad (24)$$

$$\left(\frac{P_1}{P_1'}+\frac{P_2}{P_2'}\right)\left[(|B_1|^2+|B_2|^2)\left(\frac{\xi_1^2}{\xi_1'^2}\right)-(|B_3|^2+|B_4|^2)\left(\frac{\xi_2^2}{\xi_2'^2}\right)\right]+$$

$$\left(\frac{P_1}{P_1'}+\frac{P_2}{P_2'}\right)\left[(|C_1|^2+|C_2|^2)\left(\frac{\eta_1^2}{\xi_1'^2}\right)-(|C_3|^2+|C_4|^2)\left(\frac{\eta_2^2}{\xi_2'^2}\right)\right]+$$

$$2\left(\frac{P_1}{P_1'}-\frac{P_2}{P_2'}\right)\left[\left(\frac{\xi_1\eta_1}{\xi_1'^2}\right)+\left(\frac{\xi_2\eta_2}{\xi_2'^2}\right)\left(\frac{|A_3|}{|A_1|}\right)\left(\frac{|C_3|}{|C_1|}\right)\right]$$

$$|A_1||C_1|\cos\varphi_{A_1C_1}+$$

$$2\left(\frac{P_1}{P_1'}+\frac{P_2}{P_2'}\right)\left(\frac{|A_2|}{|A_1|}\right)\left(\frac{|C_2|}{|C_1|}\right)\left[\begin{array}{c}\left(\frac{\xi_1\eta_1}{\xi_1'^2}\right)+\\ \left(\frac{\xi_2\eta_2}{\xi_2'^2}\right)\left(\frac{|A_4|}{|A_2|}\right)\left(\frac{|C_4|}{|C_2|}\right)\end{array}\right]$$

$$|A_1||C_1|\sin\varphi_{A_1C_1}+$$

$$2\left(\frac{P_1}{P_1'}\cos\varphi_{A_1B_1\varepsilon_1}+\frac{P_2}{P_2'}\cos\varphi_{A_1B_1\varepsilon_3}\right)\frac{\xi_1\zeta_1}{\xi_1'^2}|A_1||B_1|-$$

$$2\left(\frac{P_1}{P_1'}\cos\varphi_{A_3B_3\varepsilon_2}+\frac{P_2}{P_2'}\cos\varphi_{A_3B_3\varepsilon_4}\right)\frac{\xi_2\zeta_2}{\xi_2'^2}|A_3||B_3|+$$

$$2\left(\frac{P_1}{P_1'}\cos\varphi_{A_2B_2\gamma_1}+\frac{P_2}{P_2'}\cos\varphi_{A_2B_2\gamma_3}\right)\frac{\xi_1\zeta_1}{\xi_1'^2}|A_2||B_2|-$$

$$2\left(\frac{P_1}{P_1'}\cos\varphi_{A_4B_4\gamma_2}+\frac{P_2}{P_2'}\cos\varphi_{A_4B_4\gamma_4}\right)\frac{\xi_2\zeta_2}{\xi_2'^2}|A_4||B_4|+$$

-continued $$2\left(\frac{P_1}{P_1'}\cos\varphi_{B_1C_1\varepsilon_1} + \frac{P_2}{P_2'}\cos\varphi_{B_1C_1\varepsilon_3}\right)\frac{\xi_1\zeta_1}{\xi_1'^2}|B_1||C_1| -$$

$$2\left(\frac{P_1}{P_1'}\cos\varphi_{B_3C_3\varepsilon_2} + \frac{P_2}{P_2'}\cos\varphi_{B_3C_3\varepsilon_4}\right)\frac{\xi_2\zeta_2}{\xi_2'^2}|B_3||C_3| +$$

$$2\left(\frac{P_1}{P_1'}\cos\varphi_{B_2C_2\gamma_1} + \frac{P_2}{P_2'}\cos\varphi_{B_2C_2\gamma_3}\right)\frac{\xi_1\zeta_1}{\xi_1'^2}|B_2||C_2| -$$

$$2\left(\frac{P_1}{P_1'}\cos\varphi_{B_4C_4\gamma_2} + \frac{P_2}{P_2'}\cos\varphi_{B_4C_4\gamma_4}\right)\frac{\xi_2\zeta_2}{\xi_2'^2}|B_4||C_4|.$$

The parameters $$\left[\left(\frac{|A_2|}{|A_1|}\right)\left(\frac{|C_2|}{|C_1|}\right)\right], \quad (25)$$

$$\left(\frac{|A_4|}{|A_2|}\right)\left(\frac{|C_4|}{|C_2|}\right), \quad (26)$$

$$\left[\left(\frac{|A_3|}{|A_1|}\right)\left(\frac{|C_3|}{|C_1|}\right)\right] \quad (27)$$

need to be determined in order to complete the determination of a conjugated quadratures for certain end use applications. The parameters given by Equations (25), (26), and (27) can for example be measured by procedures analogous to the procedure described for the bi-homodyne detection method with respect to measuring the quantity specified by Equation (8).

The remaining description of the variant of the third embodiment is the same as the corresponding portion of the description given for the third embodiment.

A fourth embodiment obtains non-joint measurements of conjugated quadratures of fields of measurement beams reflected/scattered by a substrate using an interferometric confocal microscopy system with effects of a mismatch in indices of refraction at the substrate surface and adjacent medium compensated and with the variant of —single— homodyne detection used in the third embodiment. The fourth embodiment comprises a variant of the interferometric confocal microscopy system 110 of the first embodiment and with source 18 and beam-conditioner 22 configured to generate input beam 24 with a two frequency-shifted components. The mismatch in indices of refraction at the substrate surface and adjacent medium are compensated by the procedure described herein with respect to FIG. 1c.

The fourth embodiment comprises the interferometric confocal microscopy system of the first embodiment with a variant of microscope 120. The variant of microscope 120 comprises a low power microscope and a dichroic beam-splitter that generates two output beams that are detected by two separate detectors such as described in cited U.S. Provisional Patent Application No. 60/442,982 (ZI-45) and U.S. patent application filed Jan. 27, 2004 (ZI-45) also entitled "Interferometric Confocal Microscopy Incorporating Pinhole Hole Array Beam-Splitter" such that the components of two frequency components of output beam components 30A and 30B are directed to one of the two detectors and two other frequency components of output beam components 30A and 30B are directed to the second of the two detectors.

The fourth embodiment obtains non-joint measurements of conjugated quadratures of fields of measurement beams reflected and/or scattered by a substrate 60 using the variant of the single-homodyne detection method. The description of the variant of the single-homodyne detection method is the same as corresponding description given for single-homodyne detection method used in the third embodiment herein. The data processing procedure used in the variant of the single-homodyne detection method to extract the conjugated quadratures of the reflected and/or scattered return measurement beam is same as described for the date processing procedure described for the variant of the single-homodyne detection method used in the third embodiment.

The difference in frequencies of components of output beam components 30A and 30B corresponding to the amplitudes $A_1$ and $A_2$ is chosen in conjunction with the design of the dichroic beam-splitter such that the $A_1$ and its corresponding components of output beam components 30A and 30B are directed to one of the two detectors and $A_2$ and its corresponding components of output beam components 30A and 30B are directed to a second detector of the two detectors.

The remaining description of the fourth embodiment is the same as corresponding portions of the description given of the third embodiment.

A variant of the fourth embodiment makes joint measurements of conjugated quadratures of fields reflected and/or scattered by a substrate using an interferometric confocal microscopy system and the quad-homodyne detection method with effects of a mismatch in indices of refraction at the substrate surface and adjacent medium compensated. The variant of the fourth embodiment comprises the interferometric confocal microscopy system of the fourth embodiment with source 18 and beam-conditioner 22 configured to generate input beam 24 with four frequency components and the design of the dispersion of the dispersive element and the selection of the four frequencies such that the components of output beam components 30A and 30B corresponding to two of the four frequency components are directed to one of the two detectors and the components of output beam components 30A and 30B corresponding to two other of the four frequency components are directed to a second of the two detectors. Each pixel of the two detectors receives simultaneously two frequency components. The mismatch in indices of refraction at the substrate surface and adjacent medium are compensated by the procedure described herein with respect to FIG. 1c.

The frequencies of components of output beam components 30A and 30B corresponding to the amplitude $A_1$ and the frequencies of components of output beam components 30A and 30B corresponding to the amplitude $A_2$ may much less than the frequencies of output beam 30A and 30B or may be of some intermediate value or of the order of the frequency of the respective beams. The difference in frequencies of components of beam components 30A and 30B corresponding to amplitude $A_1$ and the difference in frequencies of components of beam components 30A and 30B corresponding to amplitude $A_2$ are generally much less than the frequencies of corresponding beams. Beam 24 comprises four frequency components for the variant of the fourth embodiment. In the variant of the fourth embodiment, the two frequency components of beam components 30A and 30B corresponding to amplitude of one component of a conjugate quadratures are directed to one of the two detectors and the two frequency components of beam components 30A and 30B corresponding to amplitude of the second component of the conjugated quadratures are directed to the second of the two detectors.

The description of the processing of measured electrical interference signals by electronic processor and controller 80 for determination of conjugated quadratures is the same as the portion of the corresponding description given for the variant of the third embodiment which uses the quad-homodyne detection method.

The temporal window functions of frequency components of beam 24 corresponding to one conjugated quadratures of a first field may be different from the temporal window functions of the other frequency components of beam 24 corresponding to a second conjugated quadratures of a second field. This difference in time between the temporal window functions may be varied and certain properties of the substrate studied. One property is the affect of the change in conductivity of the substrate produced by a first pulse and a second pulse used as a probe. Another affect is the generation of an acoustic pulse by the first pulse of beam 24 and the second pulse of beam 24 used to detect the properties of the acoustic pulse.

In certain end use applications, only one component of the conjugated quadratures of fields may need to be measured such as described in commonly owned U.S. Provisional Application No. 60/448,360 (ZI-41) entitled "Longitudinal Differential Interferometric Confocal Microscopy for Surface Profiling."

Another embodiment wherein effects of a mismatch in indices of refraction at the substrate surface and adjacent medium are compensated comprises the interferometer system of the first embodiment with interferometer 10 comprising an interferometric far-field confocal microscope such as described in U.S. Pat. No. 5,760,901 entitled "Method And Apparatus For Confocal Interference Microscopy With Background Amplitude Reduction and Compensation" by Henry A. Hill, the contents of which are herein incorporated in their entirety by reference. In the another embodiment, beam-conditioner 22 is configured as the two-frequency generator and phase-shifter such as described in cited U.S. Provisional Patent Application No. 60/442,858 (ZI-47) and cited U.S. patent application filed Jan. 27, 2004 (ZI-47) entitled "Apparatus and Method for Joint Measurements of Conjugated Quadratures of Fields of Reflected/Scattered and Transmitted Beams by an Object in Interferometry." The mismatch in indices of refraction at the substrate surface and adjacent medium are compensated by the procedure described herein with respect to FIG. 1c.

Another embodiment wherein effects of a mismatch in indices of refraction at the substrate surface and adjacent medium compensated comprises the interferometer system of the first embodiment with interferometer 10 comprising an interferometric far-field confocal microscope such as described in cited U.S. Pat. No. 5,760,901 wherein the phase masks are removed. In the another embodiment, beam-conditioner 22 is configured as the two-frequency generator and phase-shifter such as described in cited U.S. Provisional Patent Application No. 60/442,858 (ZI-47) and cited U.S. patent application Ser. No. 10/765,368 filed Jan. 27, 2004 (ZI-47) entitled "Apparatus and Method for Joint Measurements of Conjugated Quadratures of Fields of Reflected/Scattered and Transmitted Beams by an Object in Interferometry." The mismatch in indices of refraction at the substrate surface and adjacent medium are compensated by the procedure described herein with respect to FIG. 1c.

Another embodiment wherein effects of a mismatch in indices of refraction at the substrate surface and adjacent medium are compensated comprises the interferometer system of the first embodiment with interferometer 10 comprising an interferometric far field confocal microscope such as described in U.S. patent application Ser. No. 09/526,847 entitled "Multiple Layer Confocal Interference Microscopy Using Wavenumber Domain Reflectometry And Background Amplitude Reduction And Compensation" by Henry A. Hill, the contents of which are herein incorporated in their entirety by reference. In the another embodiment, two frequency generator and beam-conditioner 22 is configured as the two-frequency generator and phase-shifter such as described in cited U.S. Provisional Patent Application No. 60/442,858 (ZI-47) and cited U.S. patent application Ser. No. 10/765,368 filed Jan. 27, 2004 (ZI-47) entitled "Apparatus and Method for Joint Measurements of Conjugated Quadratures of Fields of Reflected/Scattered and Transmitted Beams by an Object in Interferometry." The mismatch in indices of refraction at the substrate surface and adjacent medium are compensated by the procedure described herein with respect to FIG. 1c.

Another embodiment wherein effects of a mismatch in indices of refraction at the substrate surface and adjacent medium are compensated comprises the interferometer system of the first embodiment with interferometer 10 comprising an interferometric far-field confocal microscope such as described in cited U.S. patent application Ser. No. 09/526,847 wherein the phase masks are removed. In the another embodiment, beam-conditioner 22 such as described in cited U.S. Provisional Patent Application No. 60/442,858 (ZI-47) and cited U.S. patent application filed Jan. 27, 2004 (ZI-47) entitled "Apparatus and Method for Joint Measurements of Conjugated Quadratures of Fields of Reflected/Scattered and Transmitted Beams by an Object in Interferometry." The mismatch in indices of refraction at the substrate surface and adjacent medium are compensated by the procedure described herein with respect to FIG. 1c.

Another embodiment wherein effects of a mismatch in indices of refraction at the substrate surface and adjacent medium are compensated comprises the interferometer system of the first embodiment with interferometer 10 comprising an interferometric near field confocal microscope such as described in U.S. Pat. No. 6,445,453 entitled "Scanning Interferometric Near-Field Confocal Microscopy" by Henry A. Hill, the contents of which are herein incorporated in their entirety by reference. In the another embodiment, beam-conditioner 22 is configured as the two-frequency generator and phase-shifter such as described in cited U.S. Provisional Patent Application No. 60/442,858 (ZI-47) and cited U.S. patent application filed Jan. 27, 2004 (ZI-47) entitled "Apparatus and Method for Joint Measurements of Conjugated Quadratures of Fields of Reflected/Scattered and Transmitted Beams by an Object in Interferometry." The mismatch in indices of refraction at the substrate surface and adjacent medium are compensated by the procedure described herein with respect to FIG. 1c.

In some embodiments, pinhole-array beam-splitter 12 may be scanned in a direction opposite to the direction of scan of substrate 60 and with a speed such that the conjugate images of the pinholes of pinhole-array beam-splitter 12 stay superimposed with spots on or in substrate 60 that are being imaged. This scanning mode of operation is analogous to the relative motions of reticle stage and a wafer stage of a lithography tool operating in a scanning mode. The issue of traditional critical alignment of conjugate confocal pinholes in a confocal microscopy system is nonexistent, i.e. the registration of the pinholes generating the array of reference beams and the pinholes generating the array of measurement beams is automatic.

In each of the above-described embodiments, a resonant build-up cavity may be incorporated in the respective interferometric confocal microscopy systems such that input beam 24 is incident on the resonant build up cavity (not shown in a Figure) such as described in commonly owned U.S. patent application Ser. No. 09/917,400 (ZI-18) entitled "Multiple-Source Arrays with Optical Transmission Enhanced by Resonant Cavities" by Henry A. Hill, the contents of which are incorporated herein in their entirety by reference. The resonant cavity is located after mirror 54. In the case of the resonant cavity, one mirror of the resonant cavity comprises the pinhole array beam-splitter 12. The frequencies of the longitudinal modes of the resonant cavity are designed to include at least the set of four frequencies that comprise input beam 24. The use of the resonant build up cavity increases the efficiency of coupling input beam 24 to the pinholes of pinhole array beam-splitter 12 with a concomitant increase in generated reference and return measurement beam components of output beam components 30A and 30B.

Also in each of the above-described embodiments, pinhole-array beam-splitter 12 may be replaced with a guided wave source such as described in U.S. Provisional Application No. 60/445,739 (ZI-39) entitled "Multiple-Source Arrays Fed By Guided-Wave Structures And Resonant Guided-Wave Structures" by Henry A. Hill, the contents of which are herein incorporated in their entirety by reference. The quided-wave source comprises a slab wave guide and in one surface of a slab wave guide, there is an array of pinholes corresponding to the pinhole array of beam-splitter 12. Thus the slab waveguide of the guided wave source serves as a pinhole array beam-splitter the same as pinhole array of beam-splitter 12 does for certain of the embodiments.

The advantage of the use of the use of the guided wave source is an increase in efficiency of coupling of input beam 24 to the pinhole-array beam-splitter as compared to that of obtained when not using the guided wave source or using the resonant build-up cavity to increase coupling efficiency.

It will be evident to one skilled in the art that images of a substrate may be obtained using a non-interferometric, non-confocal or confocal microscopy system wherein the effects of a mismatch in indices of refraction at the substrate surface and adjacent medium compensated by the procedure described herein with respect to FIG. 1c.

It will also be evident to one skilled in the art that images of a substrate may be obtained using an interferometric, non-confocal microscopy system wherein the effects of a mismatch in indices of refraction at the substrate surface and adjacent medium compensated by the procedure described herein with respect to FIG. 1c.

What is claimed is:

1. An interferometric microscope for making interferometric measurements of locations within an object that is in a medium, there being a mismatch between indices of refraction of said object and said medium, said microscope comprising:
a source for generating an input beam;
an interferometer which is configured to receive the input beam and generate therefrom a measurement beam, to focus the measurement beam onto a selected spot in the object and produce for that selected spot a return measurement beam, and to combine the return measurement beam and a reference beam to produce an interference beam; and
a detector system which is positioned to receive the interference beam,
wherein the return measurement beam travels along a path from the object to the detector system and wherein said interferometer includes a compensating layer of material positioned in the path of the return measurement beam, said compensating layer producing a mismatch in the index of refraction along the path of the return measurement beam that compensates for the mismatch between the indices of refraction of said object and said medium.

2. The interferometric microscope of claim 1 wherein the interferometric microscope is a confocal interferometric microscope and wherein said interferometer includes a plate positioned before the detector, said plate defining a pinhole through which the return measurement beam passes, and wherein the compensating layer is located along the path of the return measurement beam before the plate.

3. The interferometric microscope of claim 2 wherein the compensating layer is immediately adjacent to the plate.

4. The interferometric microscope of claim 2 wherein the interferometer further includes a plate located along a light path between the source and the object and defining a pinhole that is imaged onto the selected spot by the interferometer, said interferometer further including a compensating layer adjacent to the second-mentioned plate and positioned to produce a mismatch in the index of refraction along a beam path from the second-mentioned pinhole to the object that compensates for the mismatch between the indices of refraction of said object and said medium.

5. The interferometric microscope of claim 4 wherein the first-mentioned and second-mentioned plates are the same plate, the first-mentioned and second mentioned pinholes are the same pinhole, and the first-mentioned and second-mentioned compensating layers are the same compensating layer.

6. The interferometric microscope of claim 2 wherein the plate includes an array of pinholes, the first-mentioned pinhole being one of the pinholes of the array of pinholes.

7. The interferometric microscope of claim 2 wherein the index of refraction of the object is $n_0$, the index of refraction of the medium immediately above the object is $n_m$, the index of refraction of the compensating layer is $n_c$, and the index of refraction of the medium through which the return measurement beam passes just before reaching the compensating layer is $n_r$, and wherein $n_0$, $n_m$, $n_c$, and $n_r$ are real numbers and wherein $n_0 > n_m$ and $n_c < n_r$.

8. The interferometric microscope of claim 2 wherein the compensating layer provides compensation that is sufficient to obtain diffraction limited lateral and longitudinal depth resolutions within the object.

9. The interferometric microscope of claim 2 wherein the compensating layer is readily removable so that it can be replaced with a different compensating layer.

10. The interferometric microscope of claim 2 wherein the medium is air.

11. A confocal interferometry system for making interferometric measurements of locations within an object that is in a medium, there being a mismatch between indices of refraction of said object and said medium, said system comprising:
a plate defining a pinhole positioned to receive a source beam and separate the source beam into a reference beam on one side of the pinhole and a measurement beam on the other side of the pinhole;
an imaging system for imaging the pinhole onto a spot in the object so that the measurement beam is directed to said spot and produces for said spot a return measurement beam, said first imaging system also arranged to image said spot onto the pinhole so that the return measurement beam from said spot is directed back to said pinhole, wherein the pinhole combines the return measurement and reference beams to produce a combined beam; and a detector system including a detector element that receives the combined beam, wherein the return measurement beam travels along a corresponding path from the object to the detector system and wherein said interferometer includes a compensating layer of material positioned in the corresponding path of the return measurement beam, said compensating layer producing a mismatch in the index of refraction along the corresponding path of the return measurement beam that compensates for the mismatch between the indices of refraction of said object and said medium.

12. The confocal interferometry system of claim 11 further comprising a second imaging system that images the pinhole onto the detector element so that the combined beam is directed to the detector element.

13. The confocal interferometry system of claim 11 wherein the first imaging system is a catadioptric imaging system.

14. The interferometric microscope of claim 11 wherein the compensating layer is positioned along the corresponding path of the return measurement beam between the plate and the object.

15. The interferometric microscope of claim 14 wherein the compensating layer is near the plate.

16. The interferometric microscope of claim 14 wherein the compensating layer is up against the plate.

17. The interferometric microscope of claim 14 wherein the plate includes an array of pinholes, the first-mentioned pinhole being one of the pinholes of the array of pinholes.

18. The interferometric microscope of claim 14 wherein the index of refraction of the object is $n_o$, the index of refraction of the medium immediately above the object is $n_m$, the index of refraction of the compensating layer is $n_c$, and the index of refraction of the medium through which the return measurement beam passes just before reaching the compensating layer is $n_r$, and wherein $n_o$, $n_m$, $n_c$, and $n_r$ are real numbers and wherein $n_o > n_m$ and $n_c < n_r$.

19. The interferometric microscope of claim 14 wherein the compensating layer provides compensation that is sufficient to obtain diffraction limited lateral and longitudinal depth resolutions within the object.

20. The interferometric microscope of claim 14 wherein the compensating layer is readily removable so that it can be replaced with a different compensating layer for a different mismatch in the indices of refraction of the object and the medium.

21. The interferometric microscope of claim 14 wherein the medium is air.

22. The interferometric microscope of claim 14 wherein the first-mentioned imaging system comprises:

a beam splitter positioned to receive the measurement beam and separate that measurement beam into a transmitted portion and a reflected portion; and a reflecting surface positioned to image the pinhole onto said spot via the beam splitter and thereby direct the measurement beam from that pinhole onto said spot.

23. The interferometric microscope of claim 22 wherein the reflecting surface is substantially concentric with a point on the object.

24. The interferometric microscope of claim 23, wherein the first-mentioned imaging system further comprises a refracting surface positioned between the object and the beam splitter to receive light rays from the object.

25. The interferometric microscope of claim 24, wherein the first reflecting surface substantially conforms to a sphere having a first radius and the refracting surface conforms to a sphere having a second radius, wherein the first radius is greater than the second radius.

26. The interferometric microscope of claim 25, wherein first reflecting surface and the refracting surface have the same center of curvature.

27. The interferometric microscope of claim 23, wherein the first-mentioned imaging system further comprises a refracting surface positioned between the beam splitter and the pinhole to receive light rays focused by the reflecting surface.

28. The interferometric microscope of claim 22 wherein the reflecting surface is substantially concentric with the pinhole.

29. The interferometric microscope of claim 22 wherein the first-mentioned imaging system further comprises a second reflecting surface on the other side of the beam splitter from the first-mentioned reflecting surface and positioned to image the pinhole onto the spot on the object via the beam splitter.

30. A confocal interferometry system for making interferometric measurements of locations within an object that is in a medium, there being a mismatch between indices of refraction of said object and said medium, said system comprising:

an array of pinholes positioned to receive a source beam and, for each pinhole in the array of pinholes, separate the source beam into a corresponding reference beam on one side of the array of pinholes and a corresponding measurement beam on the other side of the array of pinholes;

an imaging system arranged to image the array of pinholes onto an array of spots in the object so that the corresponding measurement beam for each pinhole of the array of pinholes is directed to a different corresponding spot of the array of spots and produces for that spot a corresponding return measurement beam, said first imaging system also arranged to image the array of spots onto the array of pinholes so that the corresponding return measurement beam from each spot of the array of spots is directed back to a corresponding different pinhole in the array of pinholes, wherein for each pinhole the pinhole array combines the return measurement and reference beams for that pinhole to produce a corresponding combined beam; and a detector system including an array of detector elements aligned with the array of pinholes so that the corresponding combined beam for each pinhole is directed to different corresponding detector element of the array of detector elements, wherein the return measurement beams travel along corresponding paths from the object to the detector system and wherein said interferometer includes a compensating layer of material positioned in the corresponding paths of the return measurement beams, said compensating layer producing a mismatch in the index of refraction along the corresponding paths of the return measurement beams that compensates for the mismatch between the indices of refraction of said object and said medium.

31. The confocal interferometry system of claim 30 wherein the compensating layer is adjacent to the array of pinholes.

32. The confocal interferometry system of claim 30 wherein the compensating layer is up against the array of pinholes.

33. The confocal interferometric microscope of claim 30 wherein the index of refraction of the object is $n_O$, the index of refraction of the medium immediately above the object is $n_m$, the index of refraction of the compensating layer is $n_c$, and the index of refraction of the medium through which the return measurement beam passes just before reaching the compensating layer is $n_r$, and wherein $n_O$, $n_m$, $n_c$, and $n_r$ are real numbers and wherein $n_O > n_m$ and $n_c < n_r$.

34. The confocal interferometric microscope of claim 30 wherein the compensating layer provides compensation that is sufficient to obtain diffraction limited lateral and longitudinal depth resolutions within the object.

35. The confocal interferometric microscope of claim 30 wherein the compensating layer is readily removable so that it can be replaced with a different compensating layer.

36. The confocal interferometric microscope of claim 30 wherein the medium is air.

37. A microscope for making measurements of locations within an object that is in a medium, there being a mismatch in indices of refraction between said object and said medium, said microscope comprising:

a source for generating an input beam;
a detector system;
an imaging system for focusing at least part of the input beam onto a selected spot in the object to produce a return beam; and
an imaging system for imaging the selected spot onto the detector system,
wherein the return beam travels along a path from the object to the detector assembly and wherein the second-mentioned imaging system includes a compensating layer of material positioned in the path of the return beam, said compensating layer producing a mismatch in the index of refraction along the path of the return beam that compensates for the mismatch in the indices of refraction of said object and said medium.

38. The microscope of claim 37 wherein the index of refraction of the object is $n_O$, the index of refraction of the medium immediately above the object is $n_m$, the index of refraction of the compensating layer is $n_c$, and the index of refraction of the medium through which the return measurement beam passes just before reaching the compensating layer is $n_r$, and wherein $n_O$, $n_m$, $n_c$, and $n_r$ are real numbers and wherein $n_O > n_m$ and $n_c < n_r$.

39. The microscope of claim 37 wherein the compensating layer provides compensation that is sufficient to obtain diffraction limited lateral and longitudinal depth resolutions within the object.

* * * * *